US010625605B2

(12) United States Patent
Isono

(10) Patent No.: US 10,625,605 B2
(45) Date of Patent: Apr. 21, 2020

(54) VEHICULAR POWER UNIT

(71) Applicant: TOYOTA JIDOSHA KABUSHIKI KAISHA, Toyota-shi, Aichi (JP)

(72) Inventor: Hiroshi Isono, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 111 days.

(21) Appl. No.: 15/957,320

(22) Filed: Apr. 19, 2018

(65) Prior Publication Data
US 2018/0312058 A1 Nov. 1, 2018

(30) Foreign Application Priority Data

Apr. 28, 2017 (JP) ................................. 2017-090080
Jul. 24, 2017 (JP) ................................. 2017-142678

(51) Int. Cl.
*B60K 1/02* (2006.01)
*B60K 17/04* (2006.01)
(Continued)

(52) U.S. Cl.
CPC .............. *B60K 17/046* (2013.01); *B60K 1/02* (2013.01); *B60K 7/0007* (2013.01); *B60T 1/062* (2013.01); *B60T 13/741* (2013.01); *B60T 13/746* (2013.01); *F16D 65/186* (2013.01); *F16H 37/041* (2013.01); *F16H 37/065* (2013.01); *F16H 37/0826* (2013.01); *F16H 37/0833* (2013.01); *B60K 2007/0038* (2013.01);
(Continued)

(58) Field of Classification Search
CPC ...... B60K 1/02; B60K 7/0007; B60K 17/046; B60K 2007/0038; B60K 2007/0061; B60K 2007/0092; B60Y 2400/73; F16D 2121/24; F16D 65/186; F16H 25/20; F16H 37/041; F16H 37/065; F16H 37/0826; F16H 37/0833; B60T 1/062; B60T 13/741; B60T 13/746
USPC ............................................................... 475/5
See application file for complete search history.

(56) References Cited

U.S. PATENT DOCUMENTS 1,604,112 A * 10/1926 Bultman, Jr. ....... F16H 37/0833
 475/329
6,645,105 B2 * 11/2003 Kima ..................... B60K 6/365
 475/5
(Continued)

FOREIGN PATENT DOCUMENTS

JP 2007-153266 A 6/2007
JP 2008-275112 A 11/2008

*Primary Examiner* — Leslie A Nicholson, III
(74) *Attorney, Agent, or Firm* — Oliff PLC

(57) ABSTRACT

A vehicular power unit downsized using a speed reducing mechanism of high speed reduction ratio. In a vehicular power unit, a torque applied to an input shaft from an actuator is multiplied by a speed reducing mechanism to be transmitted to an axle. The speed reducing mechanism includes: an external gear of a ring gear; a first pinion that engages with the external gear; a second pinion that rotates integrally with the first pinion; a pinion shaft that rotates integrally with the first pinion and the second pinion; a center gear that rotates integrally with a sun gear; a counter gear that engages with both of the center gear and the second pinion; and a carrier shaft that rotates integrally with a carrier. The pinion shaft is coupled to the input shaft, and the carrier shaft is coupled to the axle.

18 Claims, 18 Drawing Sheets

(51) Int. Cl.
*F16H 37/04* (2006.01)
*F16H 37/06* (2006.01)
*B60T 1/06* (2006.01)
*B60T 13/74* (2006.01)
*F16D 65/18* (2006.01)
*B60K 7/00* (2006.01)
*F16H 37/08* (2006.01)
*F16H 25/20* (2006.01)
*F16D 121/24* (2012.01)

(52) U.S. Cl.
CPC .............. *B60K 2007/0061* (2013.01); *B60K 2007/0092* (2013.01); *B60Y 2400/73* (2013.01); *F16D 2121/24* (2013.01); *F16H 25/20* (2013.01)

(56) References Cited

U.S. PATENT DOCUMENTS

| | | | | |
|---|---|---|---|---|
| 8,727,924 | B2* | 5/2014 | Morimoto | F16H 3/72 475/149 |
| 10,351,117 | B2* | 7/2019 | Isono | B60T 13/748 |
| 10,384,536 | B2* | 8/2019 | Xu | B60K 17/12 |
| 10,408,317 | B2* | 9/2019 | Isono | F16H 37/0826 |
| 2010/0120574 | A1* | 5/2010 | Maekawa | F16H 1/46 475/331 |
| 2016/0327134 | A1* | 11/2016 | Boiger | F16H 3/727 |

\* cited by examiner

VEHICULAR POWER UNIT

CROSS REFERENCE TO RELATED APPLICATION

The present invention claims the benefit of Japanese Patent Applications No. 2017-142678 filed on Jul. 24, 2017, and No. 2017-090080 filed on Apr. 28, 2017, with the Japanese Patent Office.

BACKGROUND

Field of the Invention

Embodiments of the present disclosure relate to the art of a vehicular power unit for generating a drive force and a breaking force.

Discussion of the Related Art

An in-wheel motor is disposed in an inner peripheral portion of a wheel frame of a vehicle and, by outputting a drive torque, directly drives wheels to generate a drive force of the vehicle. The in-wheel motor described in JP-A-2007-153266 is downsized using general components. According to the teachings of JP-A-2007-153266, an outer rotor of a motor-for-drive and a brake disc are integrated.

JP-A-2008-275112 describes a high reduction combined planetary gear mechanism including a first planetary gear mechanism and a second planetary gear mechanism. The first planetary gear mechanism has a first sun gear, a first ring gear, and a first carrier. Similarly, the second planetary gear mechanism has a second sun gear, a second ring gear, and a second carrier. In the combined planetary gear mechanism, the first sun gear and the second sun gear are coupled on the same rotational axis, the first ring gear and the second ring gear are integrated, and the second carrier is fixed to a stationary frame. The second sun gear and the first sun gear serve as an input shaft, and the first carrier serves as an output shaft.

According to the teachings of JP-A-2008-275112, by the plurality of planetary gears held by the second carrier whose rotation has been stopped being disposed in a non-axisymmetrical manner, flexibility in choice of the number of teeth increases by a multiple of the number of planetary gears (Np) (i.e., by Np times). By flexibility in choice of the number of teeth increasing by Np times, it is made possible to obtain a high speed reduction ratio of Np times a conventional configuration.

The in-wheel motor of the kind described in JP-A-2007-153266 can drive the wheels, directly, without intervention of a differential gear or drive shaft like in a conventional vehicle. Therefore, flexibility of vehicle body design is higher and comfortability or carrying capacity of the vehicle can be improved more compared to in a conventional vehicle. Moreover, since left and right drive wheels can be independently controlled, steering stability performance or turning-while-traveling performance of the vehicle can be improved.

On the other hand, in the vehicle installed with the in-wheel motor, an unsprung load of the vehicle ends up increasing, and ride quality of the vehicle or grounding characteristics of tires end up lowering. Therefore, the in-wheel motor is required to be as small-sized and light-weight as possible. Moreover, it is desirable that a motor drive unit or braking unit installed in the vehicle also is downsized and weight-lightened.

A vehicular power unit such as an in-wheel motor or motor drive unit or a braking unit can be downsized and weight-lightened by combining them with the speed reducing mechanism described in JP-A-2008-275112. For example, in a motor drive unit, a drive torque outputted by a motor can be multiplied by combining the motor and the speed reducing mechanism. As a result, the motor drive unit can be downsized by using a small-sized motor.

As described above, the combined planetary gear mechanism described in JP-A-2008-275112 can obtain a larger speed reduction ratio than a single planetary gear mechanism. Moreover, the speed reduction ratio can be made larger by increasing the number of planetary gears. However, according to the teachings of JP-A-2008-275112, the combined planetary gear mechanism is configured by coupling two sets of the planetary gear mechanism by a common ring gear. Therefore, the number of planetary gears is restricted by the number of teeth or internal diameter of the ring gear which is an internal gear. For this reason, increase in the speed reduction ratio also ends up being limited.

Thus, there has still remained room for improvement in further downsizing and weight-lightening a vehicular power unit such as a motor drive unit or brake unit, by using a speed reducing mechanism adapted to increase a speed reduction ratio.

SUMMARY

Aspects of embodiments of the present disclosure have been conceived noting the foregoing technical problems, and it is therefore an object of embodiments of the present disclosure to provide a vehicular power unit that has been downsized and weight-lightened by combining an actuator such as a drive motor or braking apparatus and a speed reducing mechanism.

The embodiment of the present disclosure is applied to a vehicular power unit including: an actuator that generates a torque; an input shaft to which the torque is applied; an axle that transmits power to a wheel of a vehicle; and a speed reducing mechanism that reduces a rotational speed between the input shaft and the axle. In the vehicular power unit, the torque applied to the input shaft is transmitted to the axle while being multiplied to generate at least either one of a drive force or a braking force of the vehicle. In order to achieve the above-described object, according to the embodiment of the present disclosure, the speed reducing mechanism comprises: a planetary gear unit having a sun gear, a ring gear, and a carrier; an external gear formed in an outer peripheral section of the ring gear; an outer gear set having a first pinion that engages with the external gear, a second pinion that is disposed on the same rotational axis as the first pinion and rotates integrally with the first pinion, and a pinion shaft that rotates integrally with the first pinion and the second pinion; a center gear that is disposed on the same rotational axis as the sun gear and rotates integrally with the sun gear; a counter gear that is disposed between the center gear and the second pinion and engages with both of the center gear and the second pinion; a sun gear shaft that rotates integrally with the center gear and the sun gear; a carrier shaft that rotates integrally with the carrier; and a counter gear shaft that rotates integrally with the counter gear. In the vehicular power unit, at least any one of the sun gear shaft, the pinion shaft, or the counter gear shaft is configured as the input shaft, and the carrier shaft is configured as the axle.

In a non-limiting embodiment, the actuator may include a driving actuator that generates a drive torque, and the drive torque may be applied to the input shaft.

In a non-limiting embodiment, the vehicular power unit may comprise a plurality of the outer gear sets or a plurality of the counter gear shafts, and a plurality of the input shafts. The actuator may include a plurality of driving actuators, and the drive torques generated by the driving actuators may be applied, respectively, to the input shafts.

In a non-limiting embodiment, the actuator may include a plurality of the driving actuators whose characteristics differ, and the drive torques generated by the plurality of driving actuators whose characteristics differ may be applied, respectively, to the input shafts.

In a non-limiting embodiment, vehicular power unit may comprise a plurality of the outer gear sets or a plurality of the counter gear shafts, and a plurality of the input shafts. The actuator may include a driving actuator that generates a drive torque, and a braking actuator that generates a braking torque. The drive torque and the braking torque may be inputted, respectively, to the input shafts.

In a non-limiting embodiment, the actuator may include a plurality of the driving actuators, and a plurality of the braking actuators, and the drives torques generated by the drive actuators and the braking torques generated by the braking actuators may be inputted, respectively, to the input shafts.

In a non-limiting embodiment, the actuator may include an ordinary braking actuator that is activated by passage of an electric current to generate the braking torque, and a parking braking actuator that is activated by passage of an electric current to generate the braking torque and that is capable of maintaining the braking torque when passage of the electric current has been stopped. The braking torque generated by the ordinary braking actuator and the braking torque generated by the parking braking actuator may be inputted, respectively, to the input shafts.

In a non-limiting embodiment, the actuator may include a plurality of the driving actuators whose characteristics differ, and the drive torques generated by the driving actuators whose characteristics differ, the braking torque generated by the ordinary braking actuator, and the braking torque generated by the parking braking actuator may be inputted, respectively, to the input shafts.

In a non-limiting embodiment, the wheel may include a tire grounded on a road surface and a wheel frame fitted with the tire. The actuator, the input shaft, the axle, and the speed reducing mechanism may be disposed in an inner peripheral portion of the wheel frame, and the wheel frame may be coupled to the axle.

In a non-limiting embodiment, the pinion shaft or the counter gear shaft may be configured as the input shaft, and the actuator may be disposed between the speed reducing mechanism and the wheel frame in a rotational axis direction of the axle.

In a non-limiting embodiment, the wheel may include a left-side wheel and a right-side wheel provided on both sides in a vehicle width direction. The vehicular power unit may comprise: a left-side unit having the axle that transmits power to the left-side wheel, the actuator, the input shaft, and the speed reducing mechanism; and a right-side unit having the axle that transmits power to the right-side wheel, the actuator, the input shaft, and the speed reducing mechanism. The left-side unit and the right-side unit may be disposed facing each other with projecting directions of their respective axles configured oppositely to each other in the vehicle width direction.

In a non-limiting embodiment, the left-side unit may include a left-side coupling section in which the sun gear shaft is projected in an opposite direction to the left-side wheel in the vehicle width direction. The right-side unit may include a right-side coupling section in which the sun gear shaft is projected in an opposite direction to the right-side wheel in the vehicle width direction. The vehicular power unit may further comprise a clutch that selectively couples the left-side coupling section and the right-side coupling section.

In a non-limiting embodiment, the pinion shaft or the counter gear shaft may be configured as the input shaft. The actuator in the left-side unit may be disposed between the speed reducing mechanism and the left-side wheel in the vehicle width direction. The actuator in the right-side unit may be disposed between the speed reducing mechanism and the right-side wheel in the vehicle width direction.

In a non-limiting embodiment, the actuator may include a braking actuator that generates a braking torque, and the braking torque may be inputted to the input shaft.

In a non-limiting embodiment, the vehicular power unit may further comprise a plurality of the outer gear sets or a plurality of the counter gear shafts, and a plurality of the input shafts. The actuator may include a plurality of the braking actuators, and the braking torques generated by the plurality of braking actuators may be inputted, respectively, to the input shafts.

In a non-limiting embodiment, the actuator may include an ordinary braking actuator that is activated by passage of an electric current to generate the braking torque, and a parking braking actuator that is activated by passage of an electric current to generate the braking torque and that is capable of maintaining the braking torque when passage of the electric current has been stopped. The braking torque generated by the ordinary braking actuator and the braking torque generated by the parking braking actuator may be inputted, respectively, to the input shafts.

In a non-limiting embodiment, the pinion shaft or the counter gear shaft may be configured as the input shaft, and the actuator may be disposed between the speed reducing mechanism and the wheel in a rotational axis direction of the axle.

In a non-limiting embodiment, the braking actuator may comprise: a service brake mechanism that is activated by passage of an electric current to cause predetermined fellow friction materials to make frictional contact, thereby generating the braking torque; and a parking brake mechanism that is activated by passage of an electric current to generate the braking torque and that is capable of maintaining the braking torque when passage of the electric current has been stopped. The parking brake mechanism may comprise: a braking motor that is activated by passage of an electric current to output a torque; a feed screw mechanism that converts rotary motion due to an output torque of the braking motor into linear motion and generates an axial force acting in a direction causing the fellow friction materials to make frictional contact, and that is capable of maintaining the axial force when passage of an electric current to the braking motor has been stopped; and a braking motor-oriented speed reducing mechanism that transmits the output torque of the braking motor to the feed screw mechanism while multiplying.

According to the vehicular power unit of the present disclosure, a torque generated by an actuator, such as a drive torque or a braking torque, for example, is multiplied by a speed reducing mechanism to be transmitted to an axle. The speed reducing mechanism in the vehicular power unit has an external gear formed in an outer peripheral section of a ring gear of a planetary gear unit. Moreover, by a first pinion engaging with the external gear, the torque is transmitted between the ring gear and a center gear, via a second pinion that rotates integrally with the first pinion and a counter gear that engages with the second pinion. The center gear is coupled to a sun gear of the planetary gear unit via a sun gear shaft, and rotates integrally with the sun gear. Therefore, when the torque is applied to any of the sun gear shaft, a counter gear shaft, or a pinion shaft, the torque is transmitted to the ring gear, via the pinion shaft and the first pinion, from the center gear, the counter gear, or the second pinion. At that time, the first pinion rotates in the same rotational direction as the center gear and the sun gear. As a result, the ring gear rotates in a reverse rotational direction of the sun gear and a carrier. Therefore, a speed reduction ratio can be made larger to an extent that the ring gear is reverse rotated, compared to in a planetary gear unit where, for example, rotation of a ring gear is stopped to perform speed reduction between a sun gear and a carrier. Hence, the speed reducing mechanism in the vehicular power unit of the present disclosure enables the speed reduction ratio between the sun gear and the carrier to be more significantly increased without incurring a particular increase in size, compared to a conventional speed reducing apparatus. That is, the speed reducing mechanism in the vehicular power unit of the present disclosure has a high speed reducing function enabling a significantly higher speed reduction ratio to be obtained compared to the conventional art.

Furthermore, because, in the speed reducing mechanism in the vehicular power unit of the present disclosure, power transmission is made between the planetary gear unit and an input shaft by the external gear provided in the outer peripheral section of the ring gear, restrictions due to the number of planetary gears or number of teeth of the planetary gears of the planetary gear unit are more relieved, compared to in a configuration like that described in, for example, JP-A-2008-275112 where power transmission is made by internal teeth of a ring gear. Or, there is no effect from such restrictions. As a result, flexibility in setting the speed reduction ratio rises significantly, and a larger speed reduction ratio can be obtained. Therefore, the vehicular power unit of the present disclosure enables the torque generated by the actuator to be transmitted to the axle significantly multiplied by the speed reducing mechanism having the high speed reducing function. Hence, the actuator can be sufficiently downsized to an extent that an outputted torque is significantly multiplied. As a result, significant downsizing and weight-lightening of the vehicular power unit can be achieved.

Moreover, due to the vehicular power unit of the present disclosure, a drive torque generated by a driving actuator such as an electric motor, can be transmitted to the axle significantly multiplied by the speed reducing mechanism. Therefore, the driving actuator can be downsized to an extent that an outputted drive torque is multiplied, and a lightweight compact drive unit can be configured.

Moreover, according to the vehicular power unit of the present disclosure, at least two input shafts are arranged, and driving actuators are provided, respectively, to those input shafts. Therefore, a drive unit including at least two driving actuators can be configured. In the vehicular power unit thus configured, any one of the driving actuators may be used as a main system, and the other one of the driving actuators may be used as a spare system. Therefore, a compact drive unit excelling in reliability can be configured.

Moreover, according to the vehicular power unit of the present disclosure, a plurality of the driving actuators whose characteristics differ may be employed. For example, a motor suitable for medium and low speed rotation and a motor suitable for high output and high speed rotation may be employed as the driving actuators. Therefore, a drive force appropriate to running conditions can be efficiently generated. Hence, a compact drive unit excelling in reliability and having good energy efficiency can be configured.

Moreover, according to the vehicular power unit of the present disclosure, at least two input shafts may be arranged, and a driving actuator generating a drive torque and a braking actuator generating a braking torque may be provided, respectively, to those input shafts. Therefore, not only a braking force but also a drive force can be generated in the vehicular power unit. Hence, a compact drive unit having a braking function can be configured.

Moreover, according to the vehicular power unit of the present disclosure, at least four input shafts may be arranged, and a plurality of driving actuators and a plurality of braking actuators may be provided, respectively, to those at least four input shafts. Any one of the driving actuators and any one of the braking actuators may be used as a main system, and the other one of the driving actuators and the other one of the braking actuators may be used as a spare system. Therefore, a compact drive unit excelling in reliability and having a braking function can be configured.

Moreover, according to the vehicular power unit of the present disclosure, in the case of arranging at least two braking actuators, an ordinary braking actuator and a parking braking actuator may be employed. Therefore, a compact drive unit excelling in reliability and having an ordinary braking function and a parking braking function, can be configured.

Moreover, according to the vehicular power unit of the present disclosure, in the case of arranging at least two driving actuators and at least two braking actuators, a plurality of driving actuators whose characteristics differ, an ordinary braking actuator and a parking braking actuator may be arranged. Therefore, a compact drive unit excelling in reliability and having an ordinary braking function and a parking braking function, and, what is more, having good energy efficiency, can be configured.

Moreover, according to the vehicular power unit of the present disclosure, the above-described kind of drive unit or drive unit having a braking function may be disposed on an inner side of a wheel frame of a wheel. That is, a so-called in-wheel motor may be configured. Therefore, significant downsizing and weight-lightening of the in-wheel motor can be achieved. As a result, an unsprung load of a vehicle installed with the in-wheel motor can be significantly reduced, and ride comfort of the vehicle or grounding characteristics of tires can be improved.

Moreover, according to the vehicular power unit of the present disclosure, the actuator may be disposed between the speed reducing mechanism and the wheel frame. That is, the actuator may be disposed on a side that the axle projects toward the wheel frame, in a rotational axis direction of the axle. Therefore, the actuator and the input shaft to which the torque is applied from the actuator are not disposed on a back surface side opposite the wheel frame of the speed reducing mechanism. As a result, the back surface side of the speed reducing mechanism can be easily disposed in a vehicle body, via a suspension mechanism, for example. Therefore, a compact in-wheel motor having excellent installing characteristics can be configured.

Moreover, according to the vehicular power unit of the present disclosure, the drive unit or drive unit having a braking function is installed in the vehicle as a pair of a left-side unit that transmits a torque to a left-side wheel and a right-side unit that transmits a torque to a right-side wheel. Therefore, a so-called on-board type compact drive unit can be configured. Moreover, at least either one of the drive force or braking force generated in the left and right wheels can be independently controlled. Therefore, a vehicle enabling torque vectoring, for example, can be configured.

Moreover, according to the vehicular power unit of the present disclosure, a clutch that couples the sun gear shaft of the left-side unit and the sun gear shaft of the right-side unit is provided. Therefore, by engaging the clutch, fellow left and right sun gear shafts can be coupled, and differential rotation between the left and right wheels can be limited. Hence, a compact on-board type drive unit having a differential limiting function, can be configured.

Moreover, according to the vehicular power unit of the present disclosure, both the left-side unit and the right-side unit have the actuator disposed between the speed reducing mechanism and the wheel. That is, the actuator is disposed on the side that the axle projects toward the wheel, in the rotational axis direction of the axle. Therefore, the actuator and the input shaft inputted with the torque from the actuator are not disposed on the back surface side opposite the wheel of the speed reducing mechanism. As a result, in the case that the left-side unit and the right-side unit are disposed with their respective fellow back surface sides facing each other, a size in the rotational axis direction of the axle can be reduced. Therefore, a compact on-board type drive unit whose build particularly in a vehicle width direction has been downsized, can be configured.

Moreover, according to the vehicular power unit of the present disclosure, a braking torque generated by a braking actuator such as an electromagnetic brake or a motor for regenerative braking can be transmitted to the axle significantly multiplied by the speed reducing mechanism. Therefore, the braking actuator can be downsized to an extent that the outputted braking torque is multiplied, and a lightweight compact braking unit can be configured.

Moreover, according to the vehicular power unit of the present disclosure, at least two input shafts may be arranged, and the braking actuators may be provided, respectively, to those input shafts. Any one of the braking actuators may be uses as a main system, and the other one of the braking actuators may be uses as a spare system. Therefore, a compact braking unit excelling in reliability can be configured.

Moreover, according to the vehicular power unit of the present disclosure, in the case of arranging at least two braking actuators, an ordinary braking actuator and a parking braking actuator, may be provided. Therefore, a compact braking unit excelling in reliability and having an ordinary braking function and a parking braking function, can be configured.

Moreover, according to the vehicular power unit of the present disclosure, the braking actuator may be disposed between the speed reducing mechanism and the wheel. Specifically, the braking actuator may be disposed on the side that the axle projects toward the wheel, in the rotational axis direction of the axle. Therefore, the braking actuator and the input shaft to which the braking torque is applied from the braking actuator are not disposed on the back surface side opposite the wheel of the speed reducing mechanism. As a result, a compact in-wheel type braking unit having excellent installing characteristics, or a compact on-board type braking unit whose build particularly in the vehicle width direction has been downsized, can be configured.

Moreover, according to the vehicular power unit of the present disclosure, the braking actuator may be configured from a service brake mechanism and a parking brake mechanism. Therefore, a braking unit additionally including a parking brake function that holds the braking force to keep stopping the vehicle during parking, can be configured. Furthermore, according to the vehicular power unit of the present disclosure, the parking brake mechanism may also be configured from a braking motor, a feed screw mechanism, and a braking motor-oriented speed reducing mechanism. The feed screw mechanism activates by an output torque of the braking motor. The braking motor-oriented speed reducing mechanism is configured by a geared speed reducing mechanism employing a planetary gear unit, and reduces a rotational speed between an output shaft (rotor shaft) of the braking motor and an input shaft (feed screw) of the feed screw mechanism. That is, the braking motor-oriented speed reducing mechanism transmits the output torque of the braking motor to the feed screw mechanism while multiplying. Therefore, the braking motor can be downsized to an extent that the output torque is multiplied. As a result, downsizing and weight-lightening of the parking brake mechanism and, consequently, the braking actuator, can be achieved. Therefore, a compact braking unit having an ordinary braking function and a parking braking function, can be configured.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Figure 1:
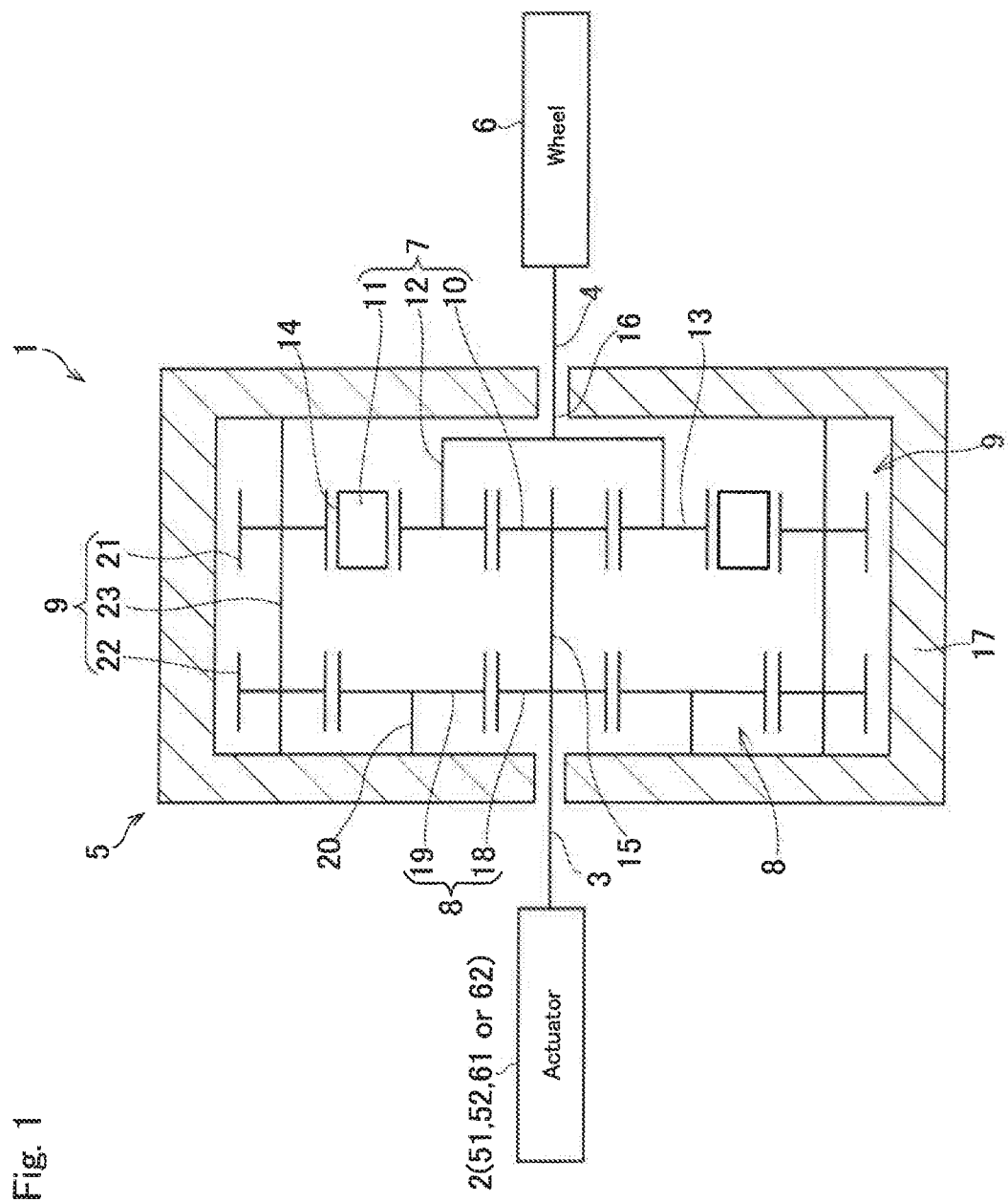
FIG. 1 is a schematic illustration showing a first embodiment of a vehicular power unit.

Preferred embodiments of the present disclosure will now be explained with reference to the accompanying drawings. Referring now to FIG. 1, there is shown a first embodiment of the vehicular power unit according to the present disclosure. As shown in FIG. 1, a vehicular power unit 1 includes an actuator 2, an input shaft 3, an axle 4, and a speed reducing mechanism 5.

The actuator 2 includes driving actuators 51, 51 of the likes of an electric motor, and braking actuators 61, 62 of the likes of a brake apparatus or a regenerative motor (i.e., a generator). That is, the actuator 2 generates a torque such as a drive torque for driving a vehicle or a braking torque for braking the vehicle. By adopting as the actuator 2 the driving actuator 51 (or 52) that generates a drive torque, this vehicular power unit 1 shown in FIG. 1 serves as a drive unit of the vehicle. Moreover, by adopting as the actuator 2 the braking actuator 61 (or 62) that generates a braking torque, the vehicular power unit 1 serves as a braking unit of the vehicle.

The input shaft 3 is coupled to a sun gear shaft 15, a counter gear shaft 20, or a pinion shaft 23 that will be mentioned later. In other words, the sun gear shaft 15, the counter gear shaft 20, or the pinion shaft 23 serves as the input shaft 3. The above-described torque generated by the actuator 2 is applied to the input shaft 3.

A later-mentioned carrier shaft 16 is coupled to the axle 4. In other words, the carrier shaft 16 serves as the axle 4, and power is transmitted to a wheel 6 of the vehicle from the axle 4.

The speed reducing mechanism 5 includes a planetary gear unit 7, a counter gear set 8, and an outer gear set 9. The speed reducing mechanism 5 reduces a rotational speed between the input shaft 3 and the axle 4, and transmits the torque of the input shaft 3 to the axle 4.

The planetary gear unit 7 which is of single pinion type has: a sun gear 10, a ring gear 11, and a carrier 12 as rotary elements that differentially rotate with respect to each other; and a plurality of planetary gears 13 supported by the carrier 12 and interposing between the sun gear 10 and the ring gear 11. An outer peripheral section of the ring gear 11 has formed therein a later-mentioned external gear 14 that engages with a later-mentioned first pinion 21 of the outer gear set 9.

The planetary gear unit 7 is supported in a case 17 of the speed reducing mechanism 5, by the sun gear shaft 15 and the carrier shaft 16. The sun gear shaft 15 of the sun gear 10 rotates integrally with a later-mentioned center gear 18, and the carrier shaft 16 of the carrier 12 rotates integrally with the carrier 12. The sun gear shaft 15 and the carrier shaft 16 are disposed in a manner enabling them to rotate relatively to each other on the same rotational axis.

In the vehicular power unit 1 shown in FIG. 1, the input shaft 3 is coupled to the sun gear shaft 15. That is, the sun gear shaft 15 serves as the input shaft 3 in this vehicular power unit 1. Moreover, the axle 4 is coupled to the carrier shaft 16. That is, the carrier shaft 16 serves as the axle 4 in this vehicular power unit 1.

Note that it is also possible for a double pinion type planetary gear unit to be used in the vehicular power unit 1, in place of the single pinion type planetary gear unit 7.

The counter gear set 8 includes the center gear 18 and at least one counter gear 19. In the vehicular power unit 1 shown in FIG. 1, the counter gear set 8 includes the center gear 18 and two counter gears 19. The center gear 18 is attached to the sun gear shaft 15 of the sun gear 10, and the counter gear 19 is attached in an integrally rotatable manner to the counter gear shaft 20. The counter gear 19 is disposed between the center gear 18 and a second pinion 22 of the outer gear set 9, and engages with both of the center gear 18 and the second pinion 22.

The outer gear set 9 includes the first pinion 21, the second pinion 22, and the pinion shaft 23. The first pinion 21 is a gear diametrically smaller than the external gear 14, and engages with the external gear 14. The second pinion 22 is also diametrically smaller than the external gear 14 and engages with the counter gear 19. The speed reducing mechanism 5 in the embodiments of the present disclosure includes at least one set of the above-described kind of outer gear sets 9, and the vehicular power unit 1 shown in FIG. 1 includes two sets of the outer gear sets 9. In order for the ring gear 11 to be supported by the outer gear set 9, at least three sets of the outer gear sets 9 are provided at equal intervals in a circumferential direction of the ring gear 11.

Figure 2:
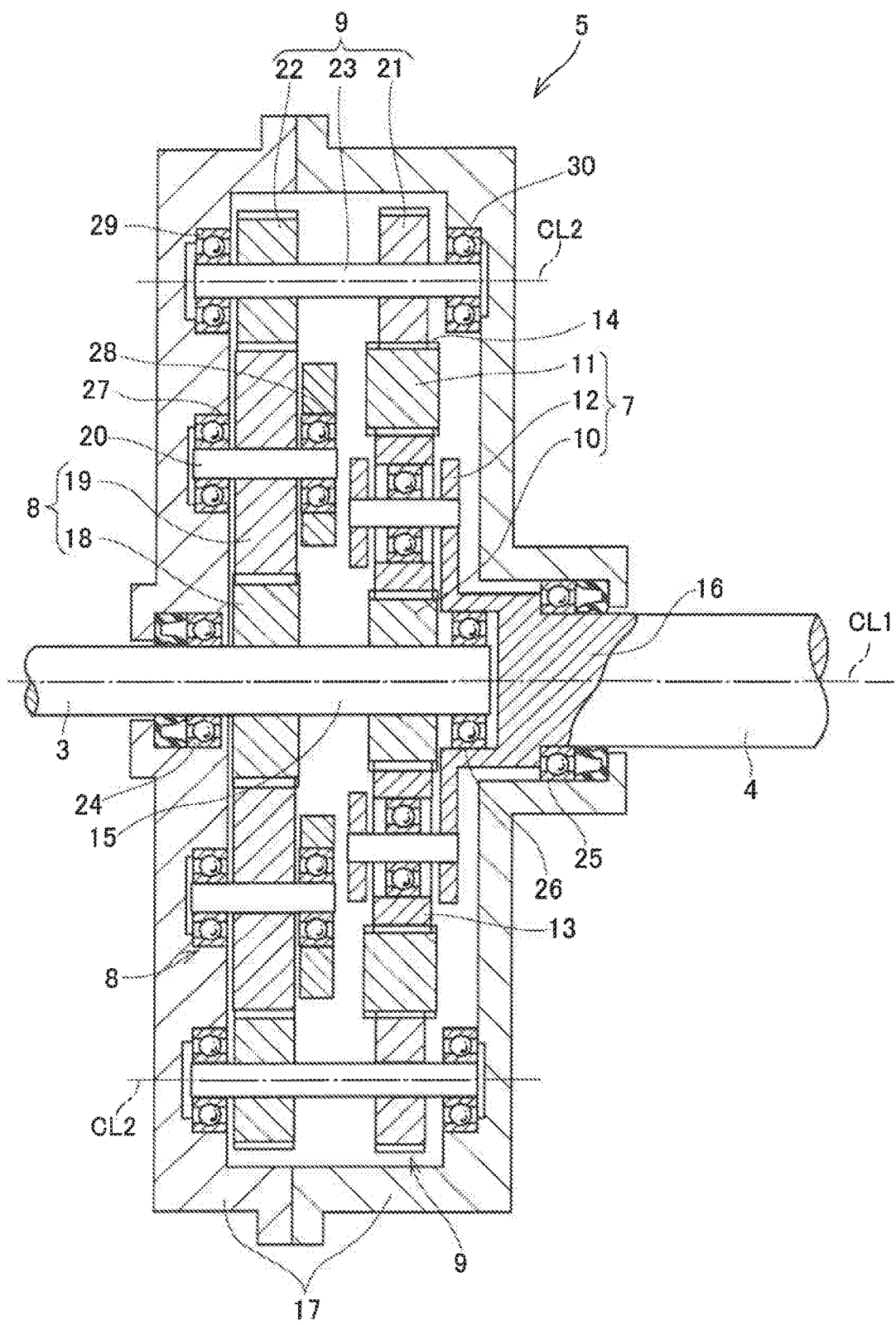
FIG. 2 is a cross-sectional view showing a configuration of a speed reducing mechanism in the vehicular power unit of the present disclosure.

FIG. 2 shows a specific configuration of the speed reducing mechanism 5 shown in FIG. 1. As described above, the speed reducing mechanism 5 comprises the planetary gear unit 7, the counter gear set 8, and the outer gear set 9. In the example shown in FIGS. 1 and 2, the sun gear shaft 15 serves as the input shaft 3, and the carrier shaft 16 serves as the axle 4.

The input shaft 3 and the sun gear shaft 15 are supported in a rotatable manner in the case 17, by a bearing 24 installed in the case 17. The axle 4 and the carrier shaft 16 are supported in a rotatable manner in the case 17, by a bearing 25 installed in the case 17. An end section on an inner side of the case 17 of the carrier shaft 16 has a bearing 26 installed therein. The sun gear shaft 15 and the carrier shaft 16 are coupled in a manner enabling them to rotate relatively to each other, via that bearing 26. In this way, the input shaft 3 and the axle 4 are disposed on the same rotational axis CL1.

The planetary gear unit 7 is disposed in parallel with the counter gear set 8 on an inside of the case 17. The sun gear 10 is attached to the sun gear shaft 15, and the sun gear 10 and sun gear shaft 15 are supported in a rotatable manner in the case 17 by the bearing 24. The carrier 12 is formed integrally with the carrier shaft 16, and the carrier 12 and carrier shaft 16 are supported in a rotatable manner in the case 17 by the bearing 25. The external gear 14 is formed in the outer peripheral section of the ring gear 11, and the external gear 14 is engaged with the first pinion 21 of the outer gear set 9.

The center gear 18 is attached to the sun gear shaft 15 so as to rotate integrally with the sun gear shaft 15, and the counter gear 19 is attached to the counter gear shaft 20 so as to rotate integrally with the counter gear shaft 20. The counter gear shaft 20 is disposed in parallel with the sun gear shaft 15, and is supported in a rotatable manner in the case 17, by a bearing 27 and a bearing 28 installed in the case 17.

The outer gear set 9 is disposed on an outer peripheral side of the planetary gear unit 7 and the counter gear set 8. The first pinion 21 is attached to the pinion shaft 23 so as to rotate integrally with the pinion shaft 23 and so as to engage with the external gear 14. Similarly, the second pinion 22 is attached to the pinion shaft 23 so as to rotate integrally with the pinion shaft 23 and so as to engage with the counter gear 19. In other words, the first pinion 21 and the second pinion 22 are disposed on the same rotational axis CL2, as shown in FIG. 2. The pinion shaft 23 is disposed in parallel with the sun gear shaft 15, and is supported in a rotatable manner in the case 17, by a bearing 29 and a bearing 30 installed in the case 17. Therefore, the first pinion 21, the second pinion 22, and the pinion shaft 23 of the outer gear set 9 all rotate as one body, and the torque is transmitted between the external gear 14 and the center gear 18 and counter gear 19.

In order to transmit the torque between the external gear 14 and the center gear 18, the speed reducing mechanism 5 includes at least one set of the outer gear sets 9. Specifically, in order for the ring gear 11 to be stably supported by the first pinion 21, at least three sets of the outer gear sets 9 are provided at equal intervals in a periphery of the ring gear 11. Note that the same number of counter gears 19 as the provided number of outer gear sets 9, are provided. For example, given that four sets of the outer gear sets 9 are disposed in the periphery of the ring gear 11, four counter gears 19 are provided so as to respectively engage with four second pinions 22.

In the speed reducing mechanism 5 shown in FIGS. 1 and 2, the torque applied to the center gear 18 can be transmitted to the external gear 14 to rotate the ring gear 11. Because the sun gear shaft 15 and the input shaft 3 rotate integrally, the torque applied to the input shaft 3 is transmitted directly to the sun gear 10 from the sun gear shaft 15. In this situation, the torque is transmitted between the center gear 18 and the external gear 14, via the counter gear set 8 and the outer gear set 9. Due to the torque transmitted to the external gear 14, the ring gear 11 is caused to rotate in a reverse rotational direction to rotational directions of the center gear 18 and the sun gear 10. As a result, a rotational speed of the carrier 12 is greatly reduced with respect to a rotational speed of the sun gear 10 by differential action of the planetary gear unit 7. In other words, a speed reduction ratio between the input shaft 3 and the axle 4 can be increased.

Figure 3:
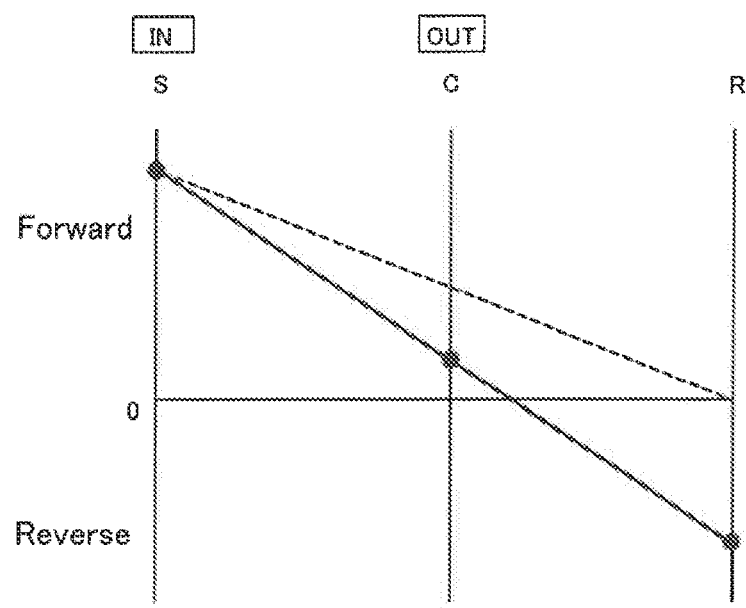
FIG. 3 is a nomographic diagram for explaining a speed reducing function of the speed reducing mechanism in the vehicular power unit of the present disclosure.

The nomographic diagram of FIG. 3 shows rotational speeds of each of the rotary elements in the planetary gear unit 7 in the case where the sun gear 10 rotates due to a torque being applied to the input shaft 3 and the sun gear shaft 15. As previously mentioned, the planetary gear unit 7 shown in FIGS. 1 and 2 is a single pinion type planetary gear unit, the sun gear shaft 15 serves as the input shaft 3, and the carrier shaft 16 serves as the axle 4 (that is, an output shaft). Therefore, the sun gear (S) 10 serves as an input element (IN), and the carrier (C) 12 serves as an output element (OUT).

As shown by the broken line in FIG. 3, in a conventional speed reducing apparatus, a rotational speed of the output element is reduced with respect to a rotational speed of the input element by using the sun gear (S) as the input element (IN) and the carrier (C) as the output element (OUT) and fixing the ring gear (R). In contrast, in the speed reducing mechanism 5 according to the embodiment in which the sun gear (S) 10 is used as the input element and the carrier (C) 12 is used as the output element, the ring gear (R) 11 rotates in a reverse rotational direction to the rotational directions of the sun gear 10 and the carrier 12. That is, when the sun gear 10 is rotated in a forward direction by the torque of the input shaft 3, the ring gear 11 is rotated in a reverse direction by the torque transmitted from the center gear 18 of the counter gear set 8 to the external gear 14 via the outer gear set 9. As a result of rotating the ring gear 11 in the reverse direction with respect to the rotational direction of the sun gear 10, the rotational speed of the carrier 12 is significantly reduced with respect to the rotational speed of the sun gear 10. Thus, the speed reduction ratio between the input element and the output element in the speed reducing mechanism 5 of the present embodiment shown by the solid line in FIG. 3 is larger than the speed reduction ratio between the input element and the output element in the conventional speed reducing apparatus shown by the broken line in FIG. 3.

Furthermore, since the ring gear 11 is rotated in the reverse direction by the torque applied to the external gear 14, flexibility in setting of a gear ratio increases more compared to in a configuration where power transmission is made by internal teeth of the ring gear as in the previously mentioned combined planetary gear mechanism described in JP-A-2008-275112. As a result, the speed reduction ratio between the input shaft 3 and the axle 4 can be significantly increased.

In a single pinion type planetary gear unit in which the sun gear is used as the input element, the carrier is used as the output element, and the ring gear is fixed, the speed reduction ratio γ is expressed as:

$$\gamma = 1 + Zr/Zs;$$

where Zs is the number of teeth of the sun gear, and Zr is the number of internal teeth of the ring gear. Note that the speed reduction ratio y in this case is the ratio of the rotational speed NIN of the input element with respect to the rotational speed NOUT of the output element (that is, γ=NIN/NOUT). In the planetary gear unit of this kind, the speed reduction ratio y achievable in stand-alone manner is from about 4 to 10. For example, given that an outer diameter of the planetary gear unit is 300 mm, in the combined planetary gear mechanism described in JP-A-2008-275112, a speed reduction ratio γ of at most roughly about 100 can be obtained. In contrast, in the speed reducing mechanism 5 in the embodiments of the present disclosure, there is high flexibility in setting of the gear ratio, without being restricted by the number of internal teeth or inner diameter of the ring gear 11 as described above. Therefore, theoretically, a speed reduction ratio y of roughly about 10000 can be obtained.

Thus, the vehicular power unit 1 in the embodiments of the present disclosure includes the speed reducing mechanism 5 that enables setting of a speed reduction ratio considerably larger compared to in a conventional configuration. In the speed reducing mechanism 5, one set of the planetary gear unit 7 and one set of the counter gear set 8 as a parallel gear pair, are arranged in parallel. Therefore, the speed reduction ratio of the speed reducing mechanism can be significantly increased compared to in the likes of, for example, a speed reducing apparatus due to a conventional combined planetary gear mechanism of the kind described in JP-A-2008-275112 or a speed reducing apparatus due to a two-stage gear train, in the case of equivalent sizes. In other words, the speed reducing mechanism 5 can be downsized.

Moreover, in the vehicular power unit 1, the torque generated by the actuator 2 can be transmitted significantly multiplied to the axle 4 by the speed reducing mechanism 5. Therefore, the actuator 2 can be downsized. As a result, the vehicular power unit 1 can be significantly downsized and weight-lightened compared to a conventional drive unit or braking unit.

Specifically, in the case of using the driving actuator 51 (or 52) as the actuator 2 in the vehicular power unit 1 shown in FIG. 1, a drive torque generated by the driving actuator 51 (or 52) may be transmitted to the axle 4 significantly multiplied by the speed reducing mechanism 5. Therefore, the driving actuator 51 (or 52) can be significantly downsized. By contrast, in the case of using the braking actuator 61 (or 62) as the actuator 2, a braking torque generated by the braking actuator 61 (or 62) may also be transmitted to the axle 4 significantly multiplied by the speed reducing mechanism 5. Therefore, the braking actuator 61 (or 62) can be significantly downsized.

In the vehicular power unit 1 shown in FIGS. 1 and 2, the torque generated by the actuator 2 is applied to the input shaft 3 (that is, the sun gear shaft 15). Instead, it is also possible for torques generated by a plurality of the actuators 2 to be respectively applied to a plurality of the input shafts 3 in the vehicular power unit 1. Note that in other examples of the vehicular power unit 1 described below, members common to the previously mentioned vehicular power unit 1 shown in FIGS. 1 and 2 are assigned with common reference symbols.

Figure 4:
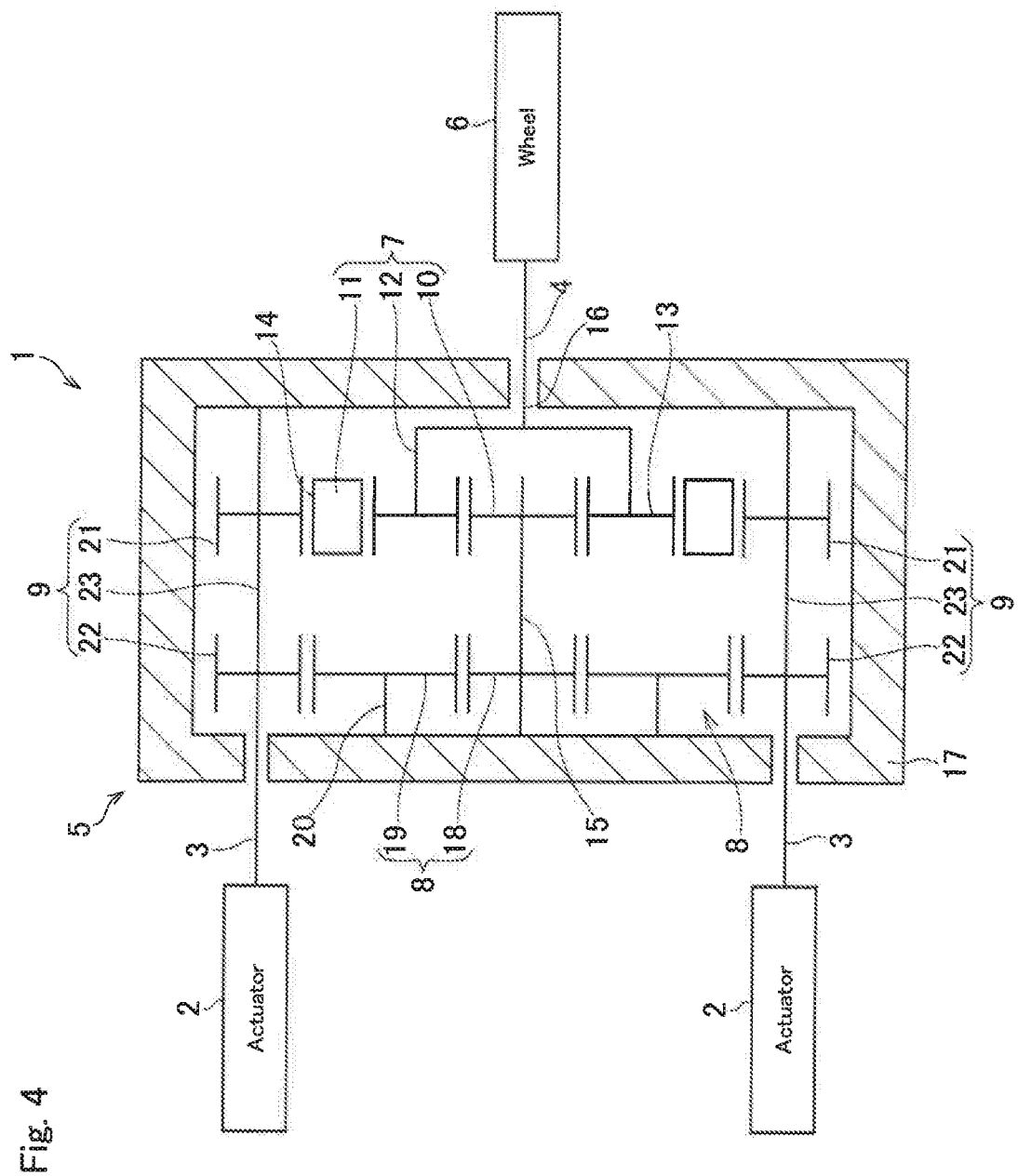
FIG. 4 is a schematic illustration showing a second embodiment of the vehicular power unit.

The vehicular power unit 1 shown in FIG. 4 comprises a plurality of the outer gear sets 9 including a plurality of the first pinions 21, a plurality of the second pinions 22, and a plurality of the pinion shafts 23. In the vehicular power unit 1 shown in FIG. 4, two sets of the outer gear sets 9 are shown, but three or more sets of the outer gear sets 9 may be provided. The first pinions 21 and the second pinions 22 are attached, respectively, to each of the pinion shafts 23. In addition, a plurality of the input shafts 3 are provided. The input shafts 3 are each respectively coupled to end sections on one side (the left side in FIG. 4) of the pinion shafts 23. In other words, end sections on one side of the pinion shafts 23 project to outside of the case 17, and projecting portions form the input shafts 3. In the example shown in FIG. 4, the two pinion shafts 23 respectively serve as the input shafts 3. This vehicular power unit 1 shown in FIG. 4 further comprises two of the actuators 2, and output shafts (not illustrated) of each of the actuators 2 are respectively coupled to the input shafts 3.

Figure 5:
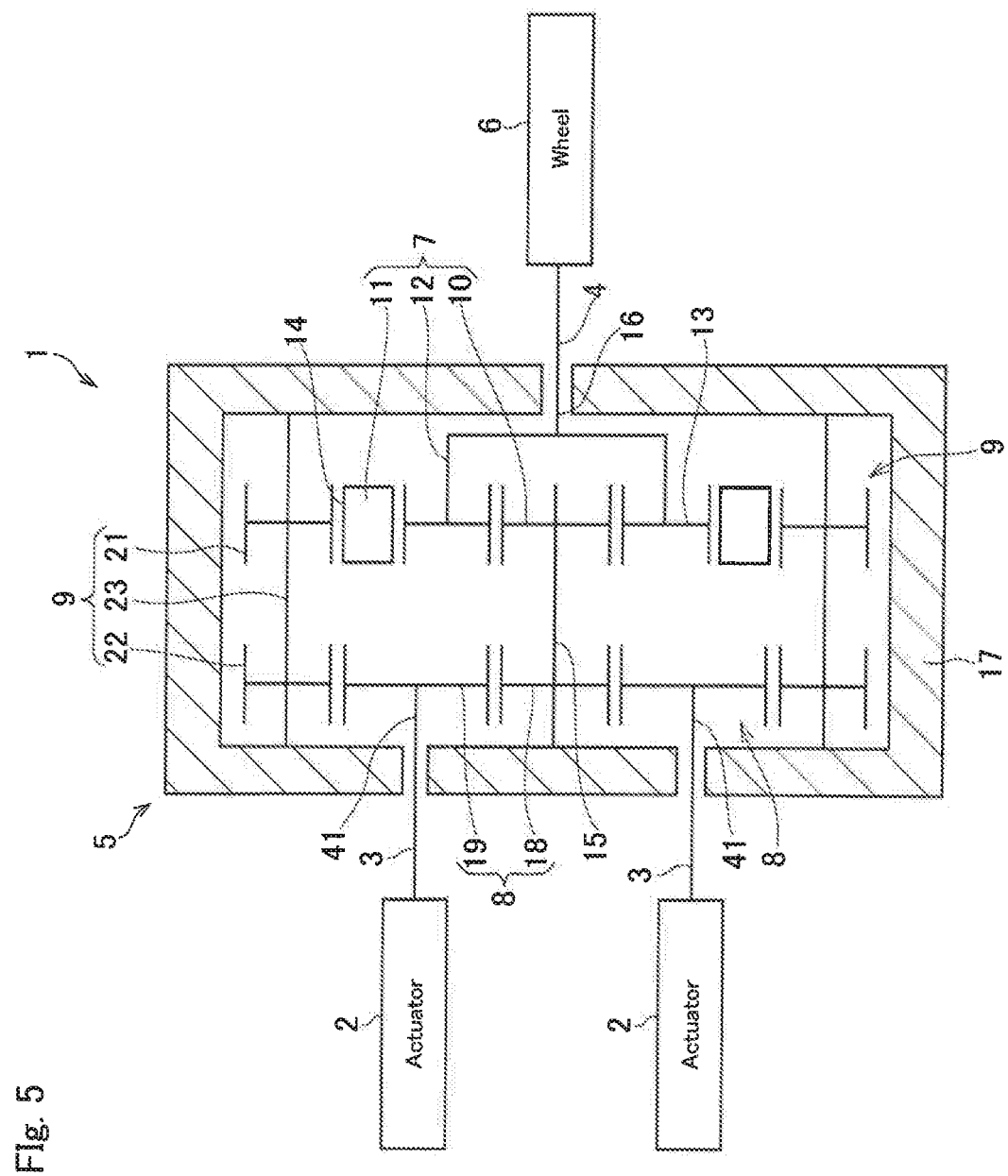
FIG. 5 is a schematic illustration showing a third embodiment of the vehicular power unit.

The vehicular power unit 1 shown in FIG. 5 comprises a plurality of the counter gear sets 8 including the counter gear 19 respectively, and a plurality of counter gear shafts 41. In the vehicular power unit 1 shown in FIG. 5, two of the counter gears 19 and two of the counter gear shafts 41 are shown. However, two or more of the counter gears 19 and two or more of the counter gear shafts 41 may be provided. The counter gears 19 are attached, respectively, to each of the counter gear shafts 41. In addition, a plurality of the input shafts 3 are provided. The input shafts 3 are each respectively coupled to end sections on one side (the left side in FIG. 5) of the counter gear shafts 41. In other words, end sections on one side of the counter gear shafts 41 project to outside of the case 17, and those projecting portions serve as the input shafts 3. In the example shown in FIG. 5, the two counter gear shafts 41 respectively serve as the input shafts 3. The vehicular power unit 1 shown in FIG. 5 further comprises two of the actuators 2, and output shafts (not illustrated) of each of the actuators 2 are respectively coupled to the input shafts 3.

As described above, in the vehicular power units 1 shown in FIGS. 4 and 5, a plurality of the input shafts 3 are provided, and the actuators 2 are respectively coupled to each of the input shafts 3 to apply torque thereto. Therefore, a transmission system of the torque generated by any one of the actuators 2 may be used as a main system, and a transmission system of the torque generated by another of the actuators 2 may be used as a subsystem. Therefore, reliability of the vehicular power unit 1 can be improved.

Figure 6:
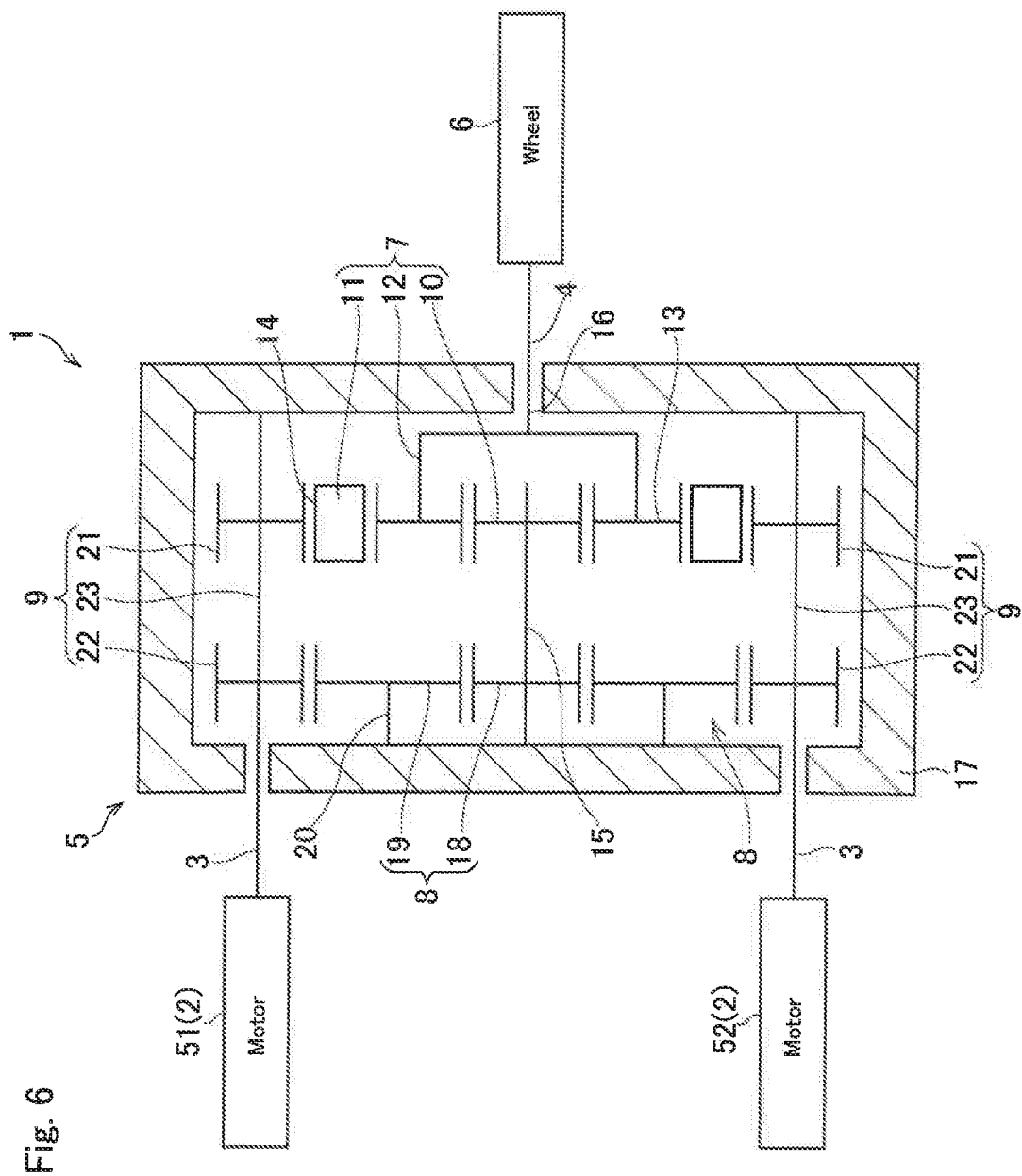
FIG. 6 is a schematic illustration showing a fourth embodiment of the vehicular power unit.

In the vehicular power unit 1 shown in FIG. 6, a plurality of the input shafts 3 are provided, and the driving actuator 51 and the driving actuator 52 are respectively coupled to each of the input shafts 3. The likes of a permanent magnet type synchronous motor or an induction motor, for example, may be adopted as the driving actuator 51 and the driving actuator 52.

Thus, in the vehicular power unit 1 shown in FIG. 6, at least a single pair of the driving actuator 51 and the driving actuator 52 are provided. Therefore, a transmission system of the drive torque generated by the driving actuator 51 may be used as a main system, and a transmission system of the drive torque generated by the driving actuator 52 may be used as a subsystem. For the above-described reasons, reliability of the vehicular power unit 1 can be improved.

Motors having different output characteristics may be used, respectively, as the driving actuator 51 and the driving actuator 52. For example, a synchronous motor suitable for medium and low vehicle speed running may be used as the driving actuator 51, and an induction motor suitable for high speed running may be used as the driving actuator 52. In this case, by switching the motor used according to a vehicle speed or a demanded amount of drive force, the drive force can be efficiently generated according to running conditions. Therefore, energy efficiency of the drive unit can be improved.

Figure 7:
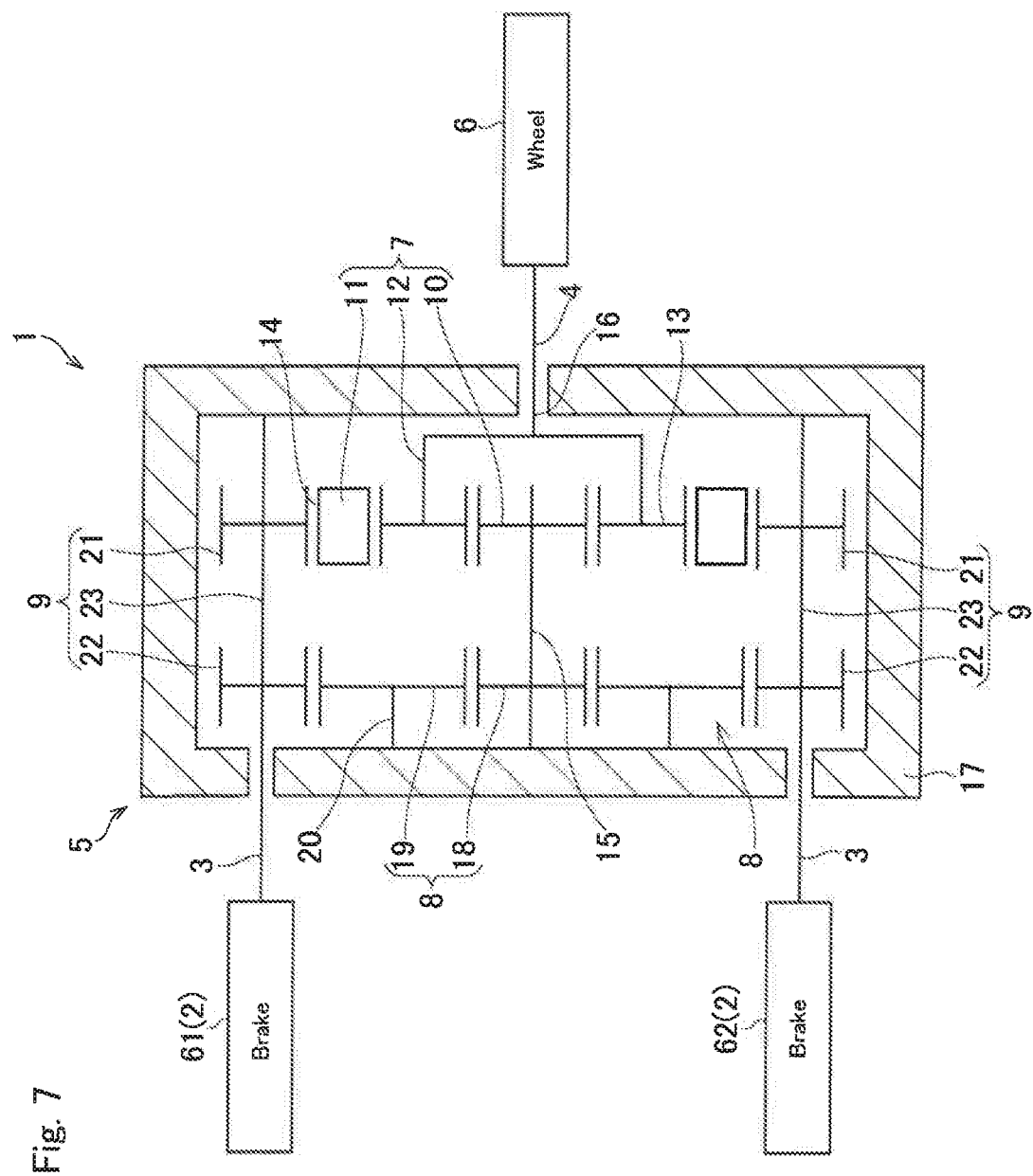
FIG. 7 is a schematic illustration showing a fifth embodiment of the vehicular power unit.

In the vehicular power unit 1 shown in FIG. 7, a plurality of the input shafts 3 are provided, and the braking actuator 61 and the braking actuator 62 are respectively coupled to each of the input shafts 3. For example, the likes of an electromagnetic brake that brakes a rotating member due to a magnetic attraction force generated by passage of an electric current, an electric brake that generates a frictional braking force using a feed screw mechanism driven by an electric motor, and a regenerative brake that brakes a rotating member utilizing a resistance force generated when generating electricity by a motor, may be used as the braking actuator 61 and the braking actuator 62.

Thus, in the vehicular power unit 1 shown in FIG. 7, at least a single pair of the braking actuator 61 and the braking actuator 62 are provided. Therefore, a transmission system of the braking torque generated by the braking actuator 61 may be used as a main system, and a transmission system of the braking torque generated by the braking actuator 62 may be used as a subsystem. Therefore, reliability of the braking unit can be improved.

Braking mechanisms having different functions or applications may be used, respectively, as the braking actuator 61 and the braking actuator 62. For example, given that an electromagnetic brake that generates a braking torque due to passage of an electric current or a regenerative brake is used as the braking actuator 61, the braking actuator 61 may be used as a normal-use brake actuator. On the other hand, given that an electric brake employing a feed screw mechanism is used as the braking actuator 62, the braking actuator 62 may be used as a parking-use brake actuator. In this case, the braking actuator 62 generates a braking torque due to passage of an electric current, and maintains the braking torque in a state when passage of the electric current has been stopped.

Figure 8:
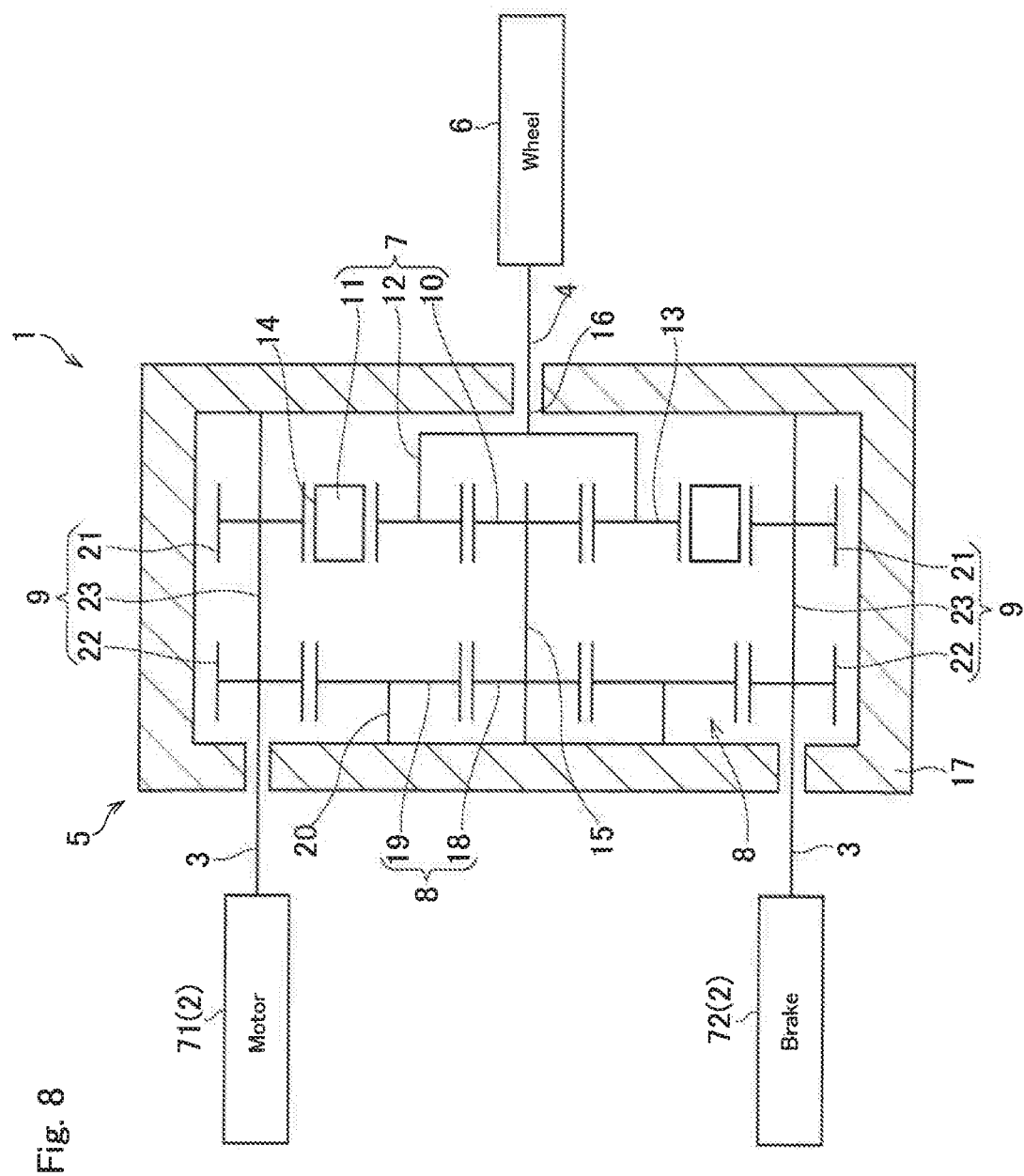
FIG. 8 is a schematic illustration showing a sixth embodiment of the vehicular power unit.

In the vehicular power unit 1 shown in FIG. 8, a plurality of the input shafts 3 are provided, and a driving actuator 71 and a braking actuator 72 are respectively coupled to each of the input shafts 3.

In the vehicular power unit 1 shown in FIG. 8, at least two of the input shafts 3 are provided, and the driving actuator 71 and the braking actuator 72 are respectively coupled to each of the input shafts 3. Therefore, a drive force and a braking force can be generated by the vehicular power unit 1.

Figure 9:
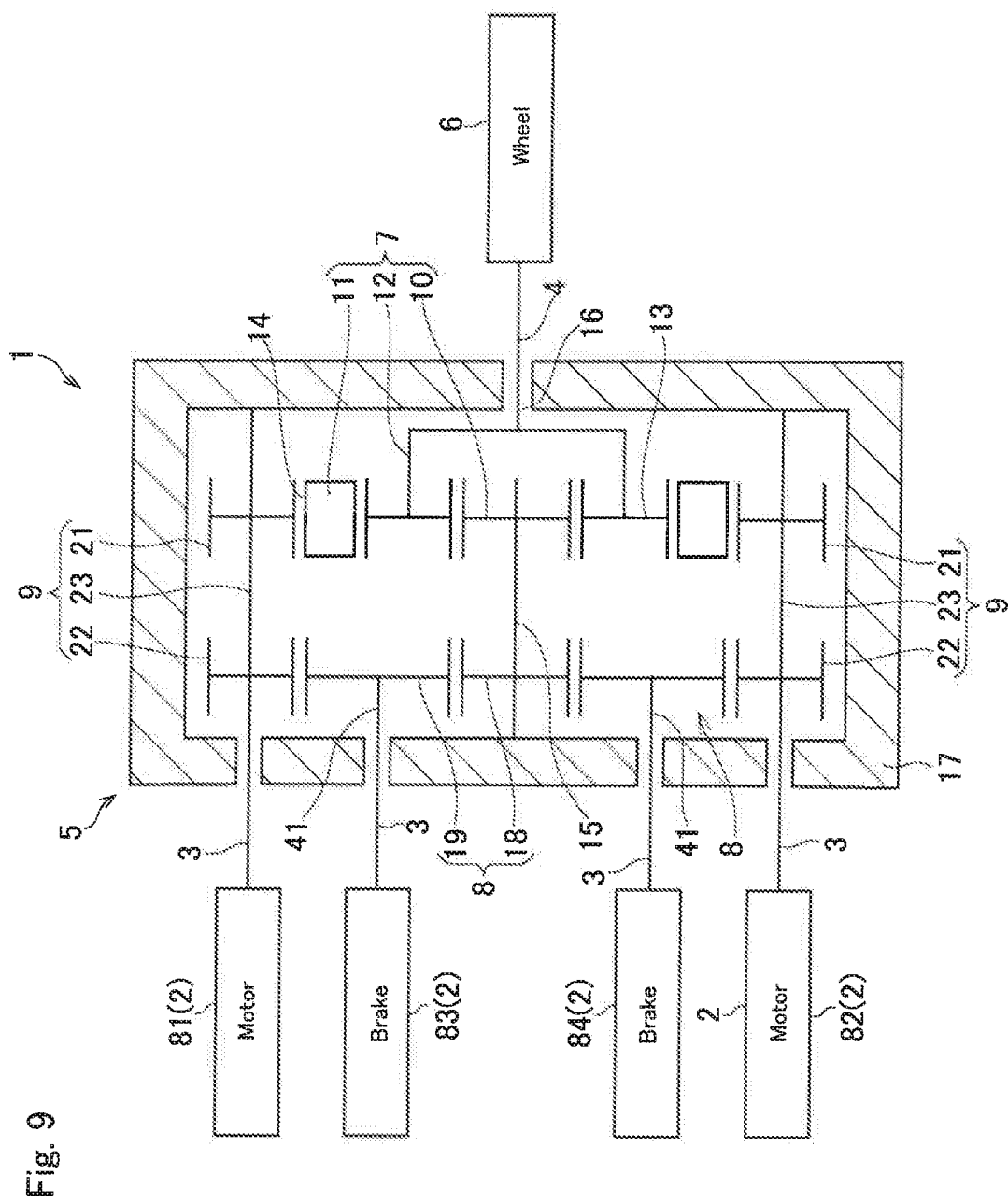
FIG. 9 is a schematic illustration showing a seventh embodiment of the vehicular power unit.

In the vehicular power unit 1 shown in FIG. 9, at least four of the input shafts 3 are provided, and driving actuators 81, 82 that generate drive torques and braking actuators 83, 84 that generate braking torques are respectively coupled to each of the input shafts 3.

In this vehicular power unit 1 shown in FIG. 9, two of the pinion shafts 23, two of the counter gear shafts 41, and four of the input shafts 3 are provided. The input shafts 3 are respectively coupled to each of the pinion shafts 23, and the driving actuator 81 and the driving actuator 82 are respectively coupled to the input shafts 3. Moreover, the input shafts 3 are respectively coupled to the counter gear shafts 41, and the braking actuator 83 and the braking actuator 84 are respectively coupled to the input shafts 3. Instead, it is also possible for the driving actuator 81 to be coupled to one of the input shafts 3 coupled to the pinion shafts 23, and for the braking actuator 83 to be coupled to the other of the input shafts 3 coupled to the pinion shafts 23. Moreover, it is possible for the driving actuator 82 to be coupled to one of the input shafts 3 coupled to the counter gear shafts 41, and for the braking actuator 84 to be coupled to the other of the input shafts 3 coupled to the counter gear shafts 41. It is also possible for the vehicular power unit 1 shown in FIG. 9 to be provided with four of the pinion shafts 23, and for the input shafts 3 to be respectively coupled to each of the pinion shafts 23. In this case, the driving actuators 81, 82 and the braking actuators 83, 84 are coupled, respectively, to each of the input shafts 3. Alternatively, it is also possible for the vehicular power unit 1 shown in FIG. 9 to be provided with four of the counter gear shafts 41, and for the input shafts 3 to be respectively coupled to each of the counter gear shafts 41. In this case, the driving actuators 81, 82 and the braking actuators 83, 84 are coupled, respectively, to each of the input shafts 3.

In this way, the vehicular power unit 1 shown in FIG. 9 includes at least a single pair of the driving actuators 81, 82 and at least a single pair of the braking actuators 83, 84. In the vehicular power unit 1 shown in FIG. 9, any one of the driving actuators 81 (or 82) and any one of the braking actuators 83 (or 84) may be used as a main system, and the other one of the actuators-for-drive 82 (or 81) and the other one of the actuators-for-braking 84 (or 83) may be used as a subsystem. Therefore, the vehicular power unit 1 shown in FIG. 9 has a braking function and enables reliability to be improved.

Moreover, a low-speed type motor may be used as the driving actuator 81, and a high-speed type motor may be used as the driving actuator 82. In addition, one of the braking actuators 83, 84 may be used as a normal-use braking actuator, and the other of the braking actuators 83, 84 may be used as a parking-use braking actuator. Therefore, reliability of the vehicular power unit 1 can be further improved, and energy efficiency can be improved.

In the vehicular power unit 1 in the embodiments of the present disclosure, the actuator 2 can be disposed on a wheel 6 side of the speed reducing mechanism 5, in a rotational axis CL1 direction of the axle 4.

Figure 10:
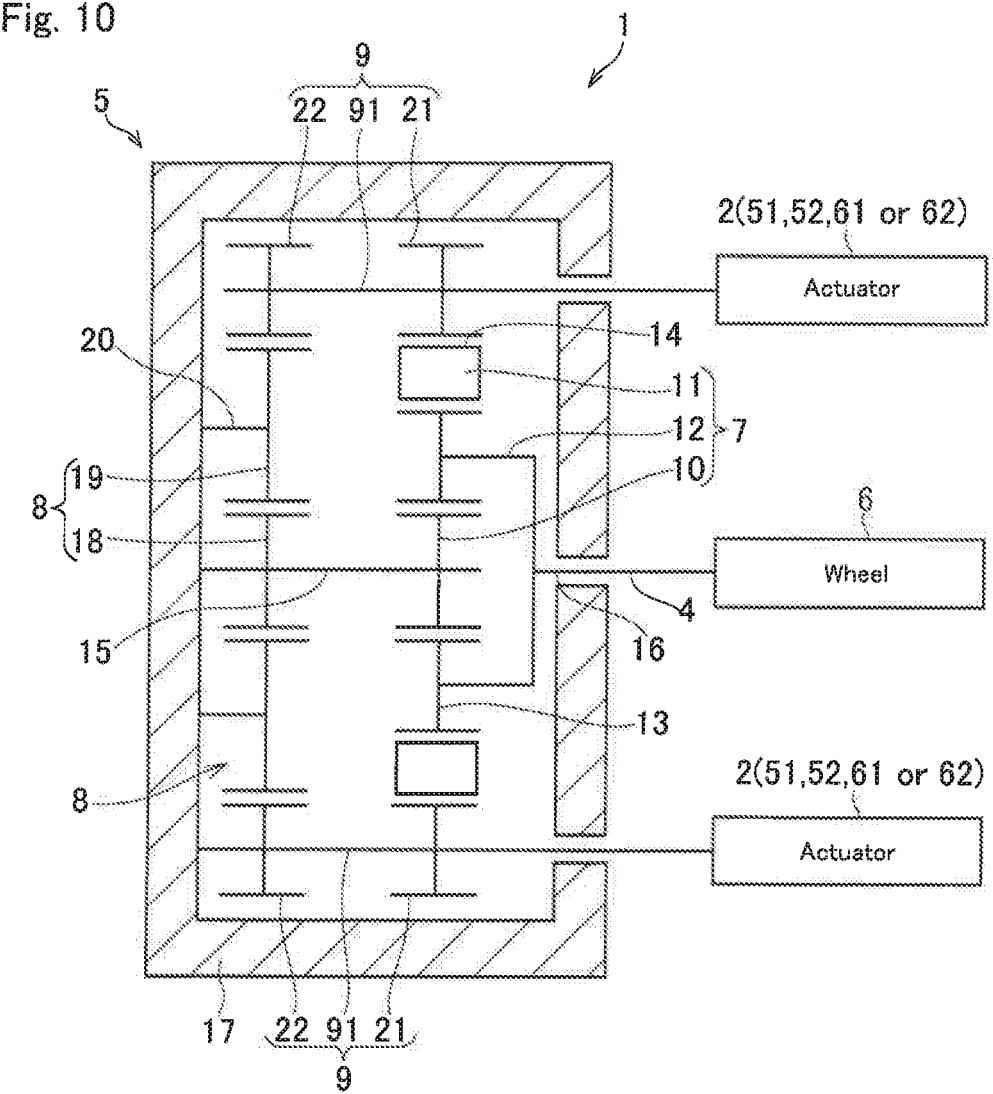
FIG. 10 is a schematic illustration showing an eighth embodiment of the vehicular power unit.
Figure 11:
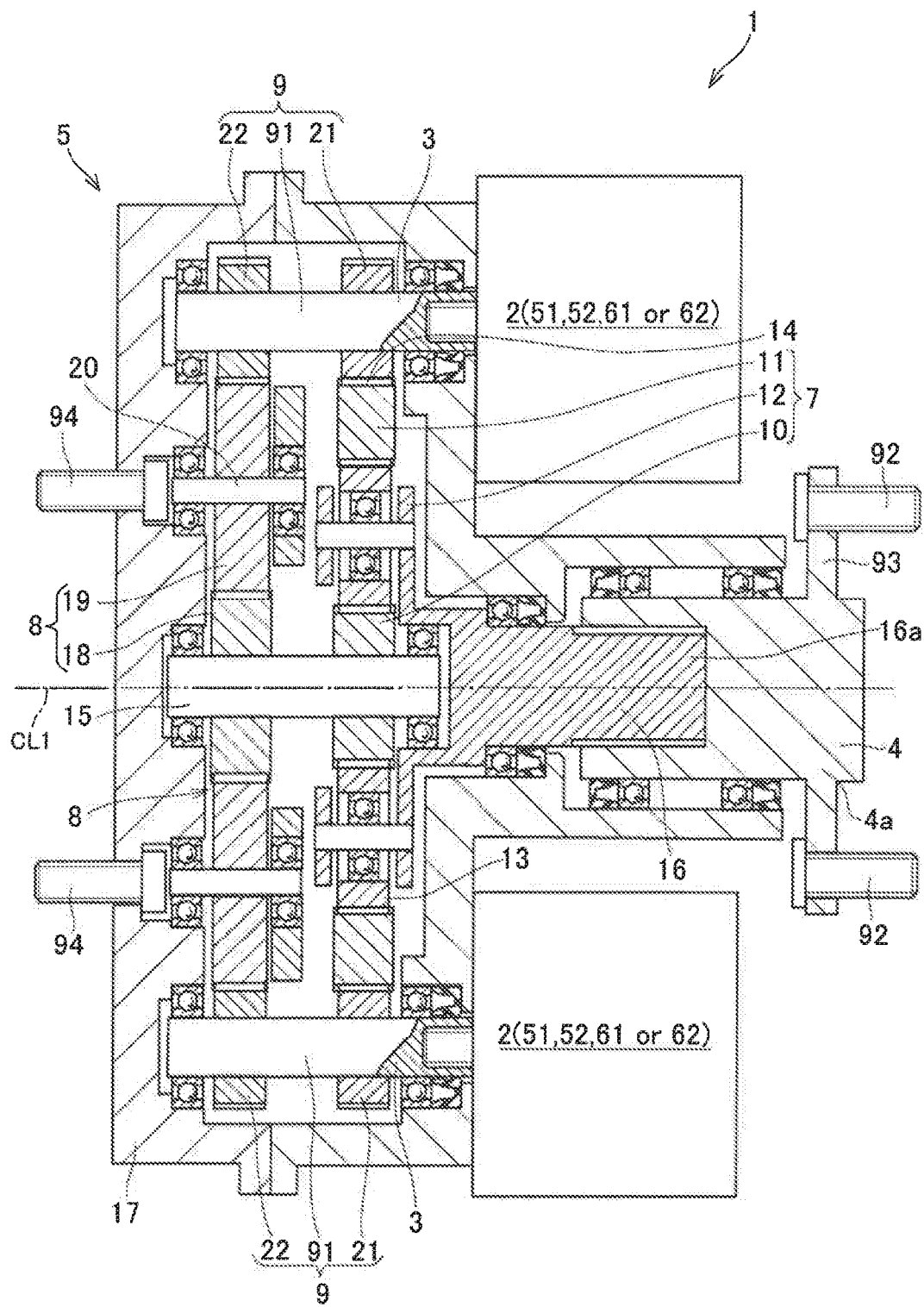
FIG. 11 is a cross-sectional view showing a specific configuration of the vehicular power unit shown in FIG. 10.

The vehicular power unit 1 shown in FIGS. 10 and 11 includes a plurality of the outer gear sets 9. Specifically, it includes a plurality of the first pinions 21, a plurality of the second pinions 22, and a plurality of pinion shafts 91. In FIGS. 10 and 11, two sets of the outer gear sets 9 are shown, but three or more sets of the outer gear sets 9 may be provided. The first pinions 21 and the second pinions 22 are attached, respectively, to each of the pinion shafts 91. Moreover, a plurality of the input shafts 3 are provided, and the input shafts 3 are each respectively coupled to end sections on one side (the right side in FIGS. 10 and 11) of the plurality of pinion shafts 91. In other words, the end sections on one side of the pinion shafts 91 projecting to outside of the case 17, serve as the input shafts 3.

In the vehicular power unit 1 shown in FIGS. 10 and 11, output shafts (not illustrated) of the actuators 2 are respectively coupled to each of the input shafts 3, and torques of each of the actuators 2 are applied to the input shafts 3. It is possible for at least any of the previously mentioned driving actuators 51, 51 or braking actuators 61, 62, for example, to be used as the actuators 2.

Thus, in the vehicular power unit 1 shown in FIGS. 10 and 11, the input shafts 3 and the axle 4 project in the same direction. Such a vehicular power unit 1 can be easily installed on an inner side of a wheel frame of the vehicle, as an in-wheel motor. Alternatively, it is also possible for two of the drive units to have their fellow back surfaces on an opposite side to the actuators 2 faced against each other to form an on-board type drive unit. In order for the vehicular power unit 1 shown in FIG. 11 to be used as an in-wheel motor, a flange 93 of the axle 4 is fixed to the wheel 6 by bolts 92. Moreover, the vehicular power unit 1 is fixed to a vehicle body by bolts 94. An example of this vehicular power unit 1 shown in FIG. 11 being used to form an in-wheel motor is shown in FIG. 12.

Figure 12:
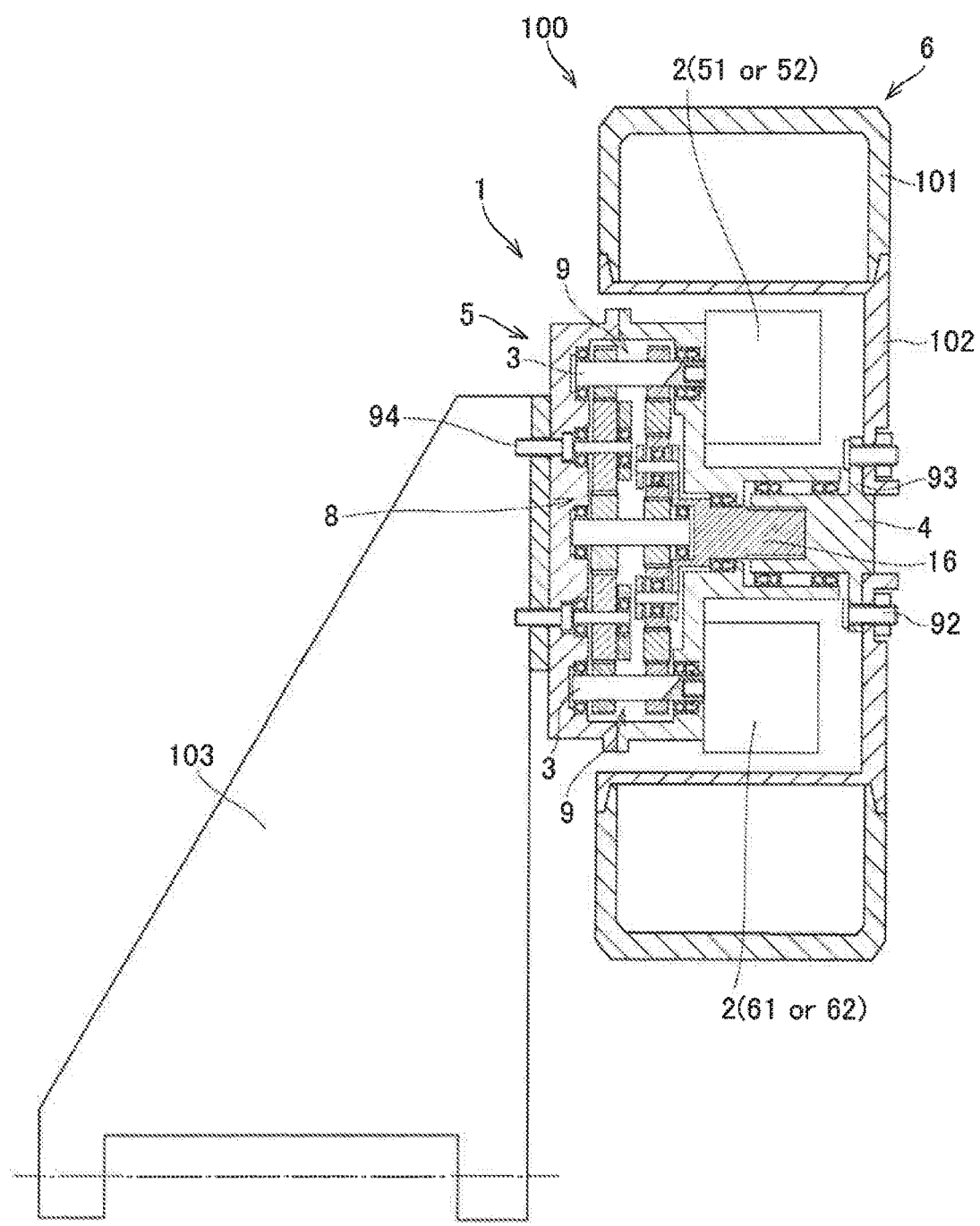
FIG. 12 is a schematic illustration showing a ninth embodiment in which the vehicular power unit is applied to configure an in-wheel motor.

An in-wheel motor 100 shown in FIG. 12 includes the vehicular power unit 1 and the wheel 6 shown in FIGS. 10 and 11. In the vehicular power unit 1 used in the in-wheel motor 100, the driving actuator 51 (or 52) is used as at least one of the actuators 2 as a prime mover of the vehicle.

As shown in the above-described FIG. 11, a tip 16a of the carrier shaft 16 projects toward an outer side (the right side in FIGS. 11 and 12) of the case 17, and the axle 4 is coupled to that tip 16a. As mentioned above, the flange 93 for fixing the wheel 6 to the axle 4 is formed in an end section 4a of the axle 4. The flange 93 is formed more outwardly in a width direction than the actuator 2, in the rotational axis CL1 direction of the axle 4.

The wheel 6 includes: a tire 101 grounded on a road surface; and a wheel frame 102 fitted with the tire 101. The vehicular power unit 1 is disposed in an inner periphery of that wheel frame 102. That is, the actuators 2, the input shafts 3, the axle 4, and the speed reducing mechanism 5 are disposed in the inner periphery of the wheel frame 102. The wheel frame 102 is fixed to the flange 93 of the axle 4 by the bolts 92. The actuators 2 are coupled to the case 17 between the speed reducing mechanism 5 and the wheel frame 102 in the rotational axis CL1 direction.

In the in-wheel motor 100, the case 17 is coupled to a suspension mechanism 103 of the vehicle, by the bolts 94.

By using the vehicular power unit 1 shown in FIGS. 10 and 11 as the in-wheel motor 100, the in-wheel motor 100 can be significantly downsized and weight-lightened. As a result, an unsprung load of the vehicle can be significantly reduced, and a ride quality of the vehicle or grounding characteristics of the tire can be improved.

Moreover, in the in-wheel motor 100, the actuators 2 are disposed between the speed reducing mechanism 5 and the wheel frame 102. Therefore, the actuators 2 and the input shafts 3 are not disposed on a back surface side facing the suspension mechanism 103 of the speed reducing mechanism 5. As a result, the back surface of the speed reducing mechanism 5 can be easily coupled to the vehicle body, via the suspension mechanism 103.

In the in-wheel motor 100 shown in FIG. 12, one driving actuator 51 (or 52) and one braking actuator 61 (or 62) are provided as the actuators 2. However, in the in-wheel motor 100, the number of actuators 2 may be changed as required. For example, the in-wheel motor 100 may be provided with only one driving actuator 51 (or 52), or may be provided with two or more actuators-for-drive 51 (or 52). Alternatively, the in-wheel motor 100 may be provided with at least one driving actuator 51 (or 52) and two or more actuators-for-braking 61 (or 62).

Furthermore, the in-wheel motor 100 shown in FIG. 12 may be provided only with at least one braking actuator 61 (or 62), without being provided with a driving actuator. In that case, the in-wheel motor 100 serves as a braking unit.

Figure 13:
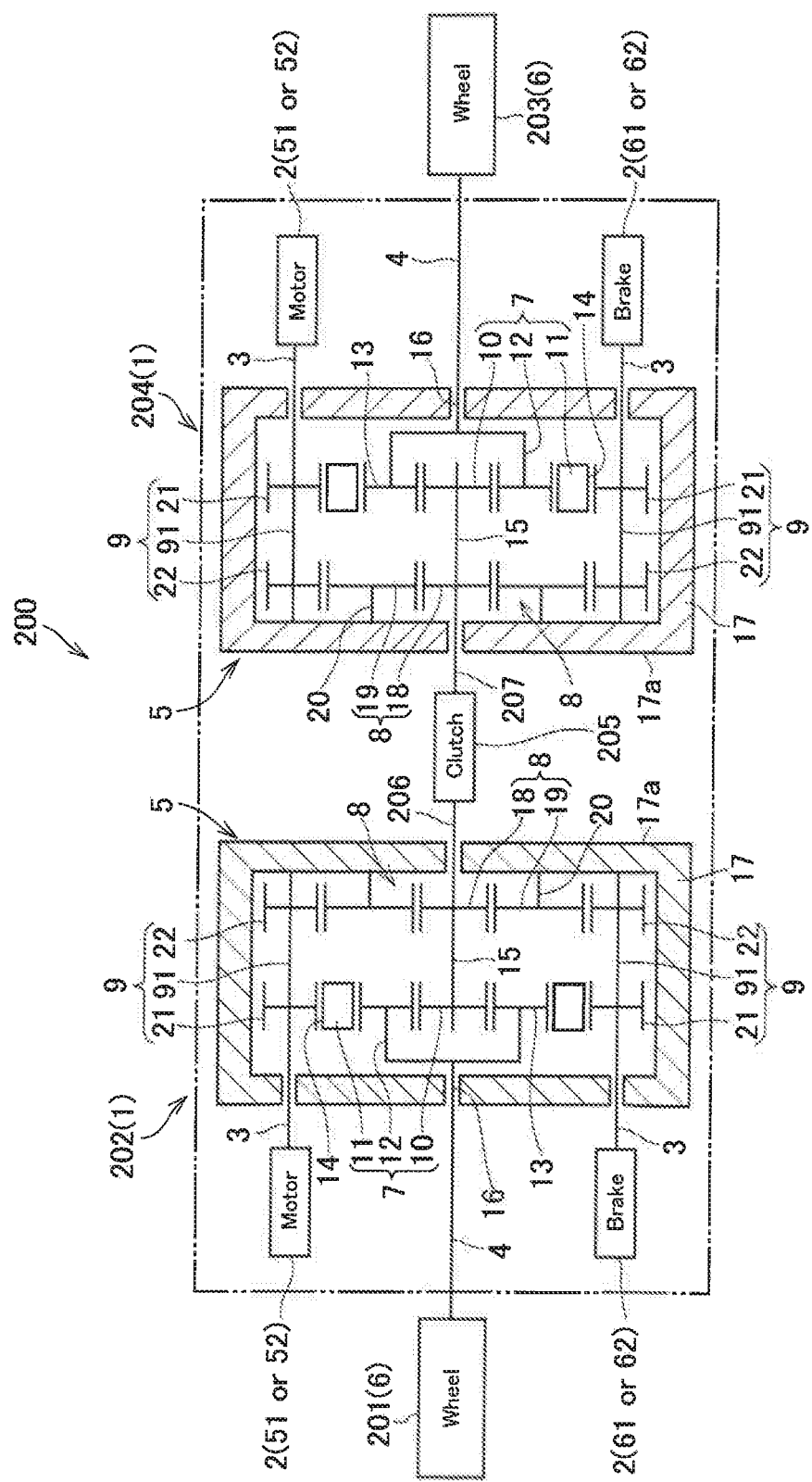
FIG. 13 is a schematic illustration showing a tenth embodiment in which the vehicular power unit is applied to configure an on-board type drive unit.
Figure 14:
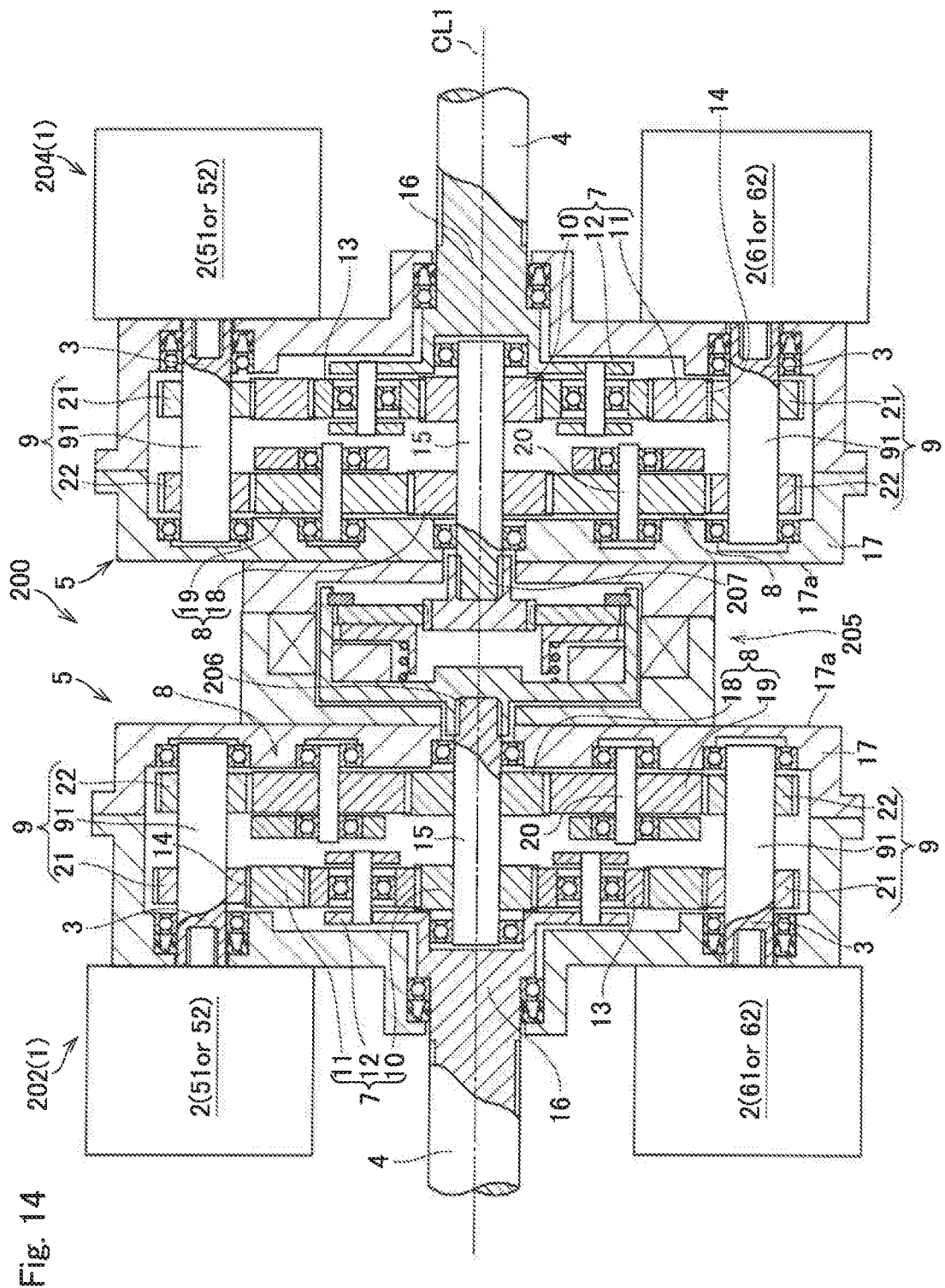
FIG. 14 is a cross-sectional view showing a specific configuration of the on-board type drive unit shown in FIG. 13.

FIGS. 13 and 14 show an example of two sets of the vehicular power unit 1 being used to form an on-board two-motor drive unit 200. Specifically, the on-board two-motor drive unit 200 is formed by combining a left-side unit 202 and a right-side unit 204. The left-side unit 202 comprises: the axle 4 that transmits power to a left-side wheel 201 (or 6); the actuators 2; the input shafts 3; and the speed reducing mechanism 5. On the other hand, the right-side unit 204 comprises: the axle 4 that transmits power to a right-side wheel 203 (or 6); the actuators 2; the input shafts 3; and the speed reducing mechanism 5.

The left-side unit 202 and the right-side unit 204 both have the same configuration as the above-mentioned vehicular power unit 1 of any of the foregoing examples. In the on-board two-motor drive unit 200 shown in FIGS. 13 and 14, the previously mentioned vehicular power unit 1 shown in FIG. 10 is used as the left-side unit 202 and the right-side unit 204.

The left-side unit 202 and the right-side unit 204 are both provided with a plurality of the input shafts 3, and the actuators 2 are respectively coupled to each of the input shafts 3. In the example shown in FIGS. 13 and 14, the driving actuator 51 (or 52) and the braking actuator 61 (or 62) are adopted as the actuators 2.

The left-side unit 202 and the right-side unit 204 are disposed so that their respective fellow back surfaces 17a face each other. Therefore, the axle 4 of the left-side unit 202 and the axle 4 of the right-side unit 204 are disposed on the same axis, and each project outwardly in a vehicle width direction.

In the on-board two-motor drive unit 200, a clutch 205 is interposed between the left-side unit 202 and the right-side unit 204. The left-side unit 202 has a left-side coupling section 206 formed in a tip on an inner side in the vehicle width direction of the sun gear shaft 15, and the right-side unit 204 has a right-side coupling section 207 formed in a tip on an inner side in the vehicle width direction of the sun gear shaft 15. The left-side coupling section 206 of the left-side unit 202 and the right-side coupling section 207 of the right-side unit 204 are selectively coupled by the clutch 205.

Specifically, the clutch 205 serves as a differential limiting mechanism that limits differential rotation between the left-side wheel 201 and the right-side wheel 203 by frictionally engaging the sun gear shaft 15 of the left-side unit 202 with the sun gear shaft 15 of the right-side unit 204. In the example shown in FIG. 14, an electromagnetic clutch is adopted as the clutch 205. The clutch 205 generates a frictional engagement force due to an elastic force of a compression coil spring in a state where there is no passage of an electric current, and, by passage of an electric current, generates a magnetic attraction force to reduce the frictional engagement force. For example, when there is no passage of electric current in the clutch 205, the clutch 205 is engaged by a biasing force due to the compression coil spring, and differential rotation between the left-side wheel 201 and the right-side wheel 203 is limited. In contrast, when there is passage of an electric current in the clutch 205, the clutch 205 is released, and the left-side wheel 201 and the right-side wheel 203 can differentially rotate.

By using the vehicular power unit 1 in the embodiments of the present disclosure to form the on-board two-motor drive unit 200, the on-board two-motor drive unit 200 can be significantly downsized and weight-lightened. Therefore, the vehicle can be weight-lightened, and moreover, energy efficiency can be improved. In addition, the on-board two-motor drive unit 200 can be easily mounted in a vehicle, and a vehicle interior can be made larger. Furthermore, in the on-board two-motor drive unit 200, the drive force and the braking force generated in the left-side wheel 201 and the right-side wheel 203 can be independently controlled. Therefore, torque vectoring is enabled in a vehicle mounted with the on-board two-motor drive unit 200.

Moreover, the actuators 2 are disposed between the speed reducing mechanism 5 and the wheel 6 in both the left-side unit 202 and the right-side unit 204. In other words, the actuators 2 and the input shafts 3 to which torque is applied from the actuators 2 are not disposed on the back surface 17a side of the speed reducing mechanism 5. Therefore, a width of the on-board two-motor drive unit 200 can be reduced.

In the on-board two-motor drive unit 200, one driving actuator 51 (or 52) and one braking actuator 61 (or 62) are provided as the actuators 2. However, in the on-board two-motor drive unit 200, the number of actuators 2 may be changed as required. For example, the on-board two-motor drive unit 200 may be provided with only one driving actuator 51 (or 52), or may be provided with two or more actuators-for-drive 51 (or 52). Alternatively, the on-board two-motor drive unit 200 may be provided with at least one driving actuator 51 (or 52) and two or more actuators-for-braking 61 (or 62).

Furthermore, the left-side unit 202 and the right-side unit 204 may be provided only with at least one braking actuator 61 (or 62), without being provided with a driving actuator. In that case, the on-board two-motor drive unit 200 serves as a braking unit.

Figure 15:
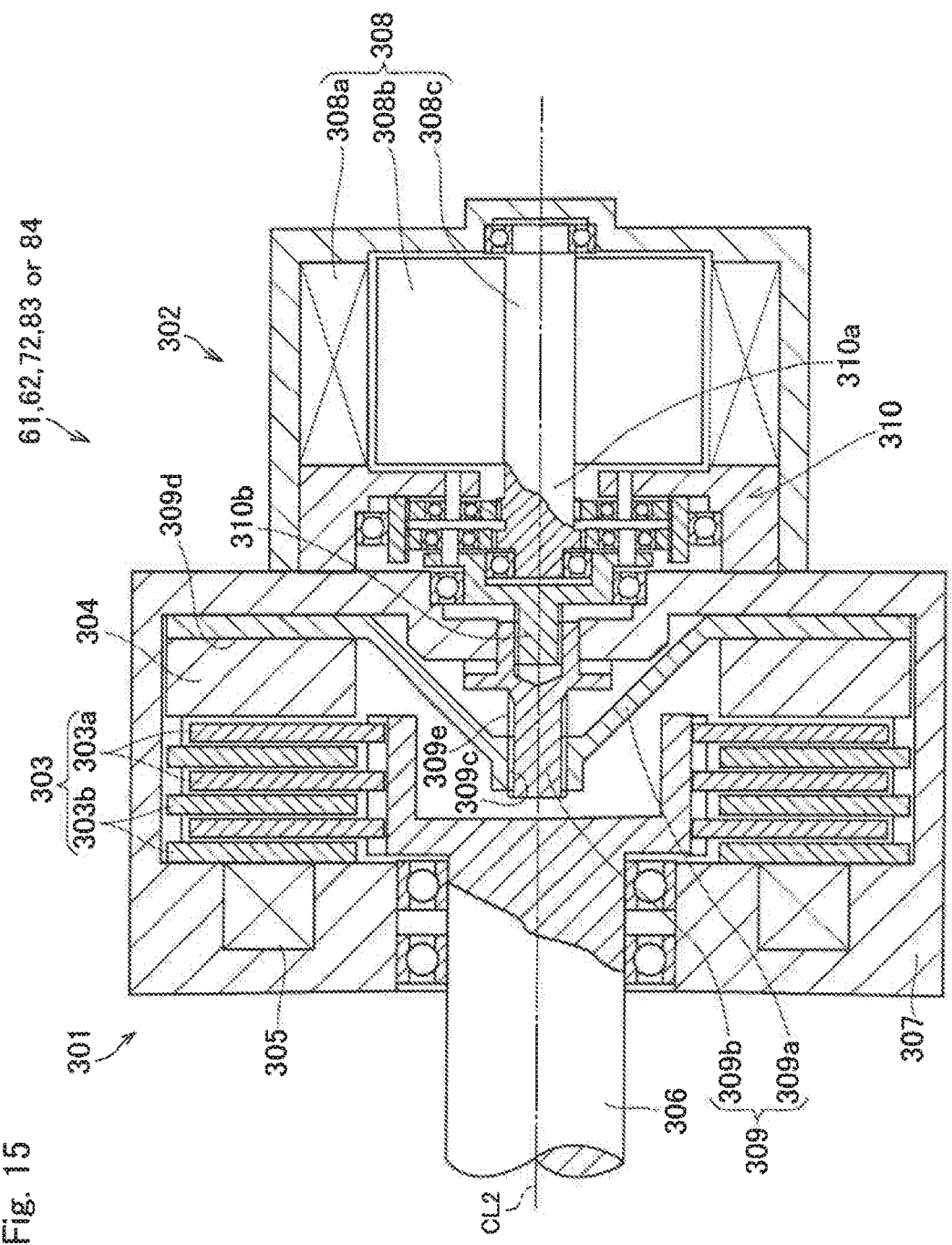
FIG. 15 is a cross-sectional view for explaining a configuration of a braking actuator in the vehicular power unit of the present disclosure.

FIG. 15 shows one example of specific configuration of the braking actuator 61 (62, 72, 83, or 84) in the embodiments of the present disclosure. The braking actuator 61 (62, 72, 83, or 84) shown in FIG. 15 includes: a service brake mechanism 301 that is operated during normal braking; and a parking brake mechanism 302 that is operated during parking or stopping to maintain a braking force. A multi-plate type electromagnetic brake that is activated to halt a predetermined rotary member by passage of an electric current is adopted as the service brake mechanism 301. The service brake mechanism 301 includes a friction plate 303, a pushing plate 304, a coil 305, and an output shaft 306.

The friction plate 303 includes: a plurality of rotary plates 303a at least part of which is formed by a magnetic body; and a plurality of fixed plates 303b at least part of which is formed by a magnetic body. In the example shown in FIG. 15, the friction plate 303 includes three rotary plates 303a and three fixed plates 303b. The rotary plates 303a are fixed to the output shaft 306 so as to rotate integrally with the output shaft 306. The fixed plates 303b are installed in a case 307 of the braking actuator 61 (62, 72, 83, or 84) so as to be able to move in an axial direction of the output shaft 306 but be unable to rotate in a rotational direction of the output shaft 306. These rotary plates 303a and fixed plates 303b are disposed alternately in a rotational axis CL2 direction.

The pushing plate 304 is formed an annular magnetic body. The pushing plate 304 is installed in the case 307 so as to be able to move in the rotational axis CL2 direction but be unable to rotate in the rotational direction of the output shaft 306.

The coil 305 is fixed to the case 307 and generates a magnetic attraction force by being applied with a certain voltage. The magnetic attraction force generated by the coil 305 acts on the friction plate 303 and the pushing plate 304, and causes the pushing plate 304 to be drawn to a friction plate 303 side. Therefore, due to passage of an electric current in the coil 305, the friction plate 303 is pressed by the pushing plate 304, the rotary plates 303a and fixed plates 303b of the friction plate 303 frictionally engage, and a braking torque is generated.

As shown in, for example, the previously mentioned FIG. 11, the output shaft 306 is coupled to the input shaft 3 and the pinion shaft 91 of the speed reducing mechanism 5, and rotates integrally with those input shaft 3 and pinion shaft 91. Moreover, as described above, the rotary plates 303a are attached to the output shaft 306 so as to rotate integrally with the output shaft 306. Therefore, the braking torque generated by frictional engagement of the rotary plates 303a and the fixed plates 303b is transmitted to the output shaft 306 of the speed reducing mechanism 5 via the output shaft 306.

Therefore, in this service brake mechanism 301, the magnetic attraction force generated by passage of an electric current in the coil 305 causes the pushing plate 304 to be drawn to the friction plate 303 side and the friction plate 303 to be pressed by the pushing plate 304. As a result, the rotary plates 303a and the fixed plates 303b frictionally engage. In other words, the service brake mechanism 301 generates the breaking torque by passage of an electric current in the coil 305.

The parking brake mechanism 302 is configured to be capable of generating a braking torque when activated by passage of an electric current and be capable of maintaining the braking torque in a state when passage of the electric current has been stopped. Specifically, the parking brake mechanism 302 includes a braking motor 308, a feed screw mechanism 308, and a braking motor-oriented speed reducing mechanism 310.

The braking motor 308 is an electric motor that generates a drive torque when activated by passage of an electric current. The braking motor 308 comprises: a stator 308a; a rotor 308b; and a rotor shaft 308c that rotates integrally with the rotor 308b. The stator 308a is fixed to the case 307 in a non-rotatable manner. The rotor shaft 308c configures an output shaft of this braking motor 308, and rotates integrally with a later-mentioned input shaft 310a of the braking motor-oriented speed reducing mechanism 310.

The feed screw mechanism 309 converts rotary motion into linear motion, and presses the pushing plate 304 to the friction plate 303 side (the left side in FIG. 15) in the rotational axis CL2 direction and thereby generates an axial force for causing frictional engagement between the rotary plates 303a and the fixed plates 303b. In addition, the feed screw mechanism 309 is configured so that, even when passage of the electric current has been stopped in a state of the axial force being generated, it is possible to maintain a state of the rotary plates 303a and the fixed plates 303b being frictionally engaged to brake the output shaft 306. The feed screw mechanism 309 is configured from a pushing member 309a and a feed screw member 309b.

The pushing member 309a is formed by a disc-shaped non-magnetic body. A female screw section 309c of the feed screw is formed in a central portion of the pushing member 309a so as to penetrate the pushing member 309a in a disc thickness direction of the pushing member 309a (a left-right direction in FIG. 15). The pushing member 309a is installed in the case 307 so as to be able to move in the rotational axis CL2 direction but be unable to rotate in the rotational direction of the output shaft 306. The pushing member 309a is disposed adjacently to the pushing plate 304 in the rotational axis CL2 direction. The pushing member 309a has a contact surface 309d that contacts the pushing plate 304 and causes an axial force (a pressing force) in the rotational axis CL2 direction to act on the pushing plate 304.

The feed screw member 309b is a rotating shaft of the feed screw mechanism 309, and has a male screw section 309e formed in an outer periphery of the feed screw member 309b. The feed screw member 309b rotates integrally with a later-mentioned output shaft 310b of the braking motor-oriented speed reducing mechanism 310.

The male screw section 309e of the feed screw member 309b is screwed into the female screw section 309c of the pushing member 309a. The female screw section 309c and the male screw section 309e of the feed screw mechanism 309 are formed by, for example, a ball screw, or a trapezoid-threaded or square-threaded screw.

The feed screw mechanism 309, by rotating the feed screw member 309b in a forward direction, generates an axial force in a forward movement direction bringing the pushing member 309a closer to the pushing plate 304 in the rotational axis CL2 direction. Moreover, the feed screw mechanism 309, by rotating the feed screw member 309b in a reverse direction, generates an axial force in a backward movement direction distancing the pushing member 309a from the pushing plate 304 in the rotational axis CL2 direction.

The braking motor-oriented speed reducing mechanism 310 has the input shaft 310a and the output shaft 310b, and reduces rotational speed of the output shaft 310b with respect to rotational speed of the input shaft 310a. In other words, the braking motor-oriented speed reducing mechanism 310 transmits the torque applied to the input shaft 310a to the output shaft 310b while multiplying. The rotor shaft 308c of the braking motor 308 is coupled to the input shaft 310a. That is, the input shaft 310a rotates integrally with the rotor shaft 308c. The feed screw member 309b of the feed screw mechanism 309 is coupled to the output shaft 310b. That is, the output shaft 310b rotates integrally with the feed screw member 309b.

Thus, in this parking brake mechanism 302, an output torque of the braking motor 308 is multiplied by the braking motor-oriented speed reducing mechanism 310 to be transmitted to the feed screw mechanism 309. Therefore, the braking motor 308 can be downsized, and the parking brake mechanism 302 can be downsized and weight-lightened. In addition, the braking actuator 61 (62, 72, 83, or 84) can be significantly downsized and weight-lightened.

The parking brake mechanism 302 applies a torque in a forward rotational direction to the feed screw member 309b of the feed screw mechanism 309. Consequently, the rotary plates 303a and the fixed plates 303b are frictionally engaged to each other to apply a braking torque to the output shaft 306. The braking torque of the parking brake mechanism 302 applied to the output shaft 306 can be reduced by applying a torque in a reverse rotational direction to the feed screw member 309b.

In the feed screw mechanism 309 of the parking brake mechanism 302, a reverse efficiency to rotate the feed screw member 309b in the backward direction by withdrawing the pushing member 309a is adjusted to be lower than a forward efficiency to move the pushing member 309a in the forward direction by rotating the feed screw member 309b in the forward direction. Therefore, the output shaft 306 may be halted continuously by pushing the pushing member 309a and the pushing plate 304 in the forward direction by the feed screw mechanism 309. For this reason, after halting the output shaft 306 by actuating the feed screw mechanism 309 by the braking motor 308, the output shaft 306 may be halted continuously by the parking brake mechanism 302 even if the current supply to the service brake mechanism 301 and braking motor 308 is stopped.

Figure 16:
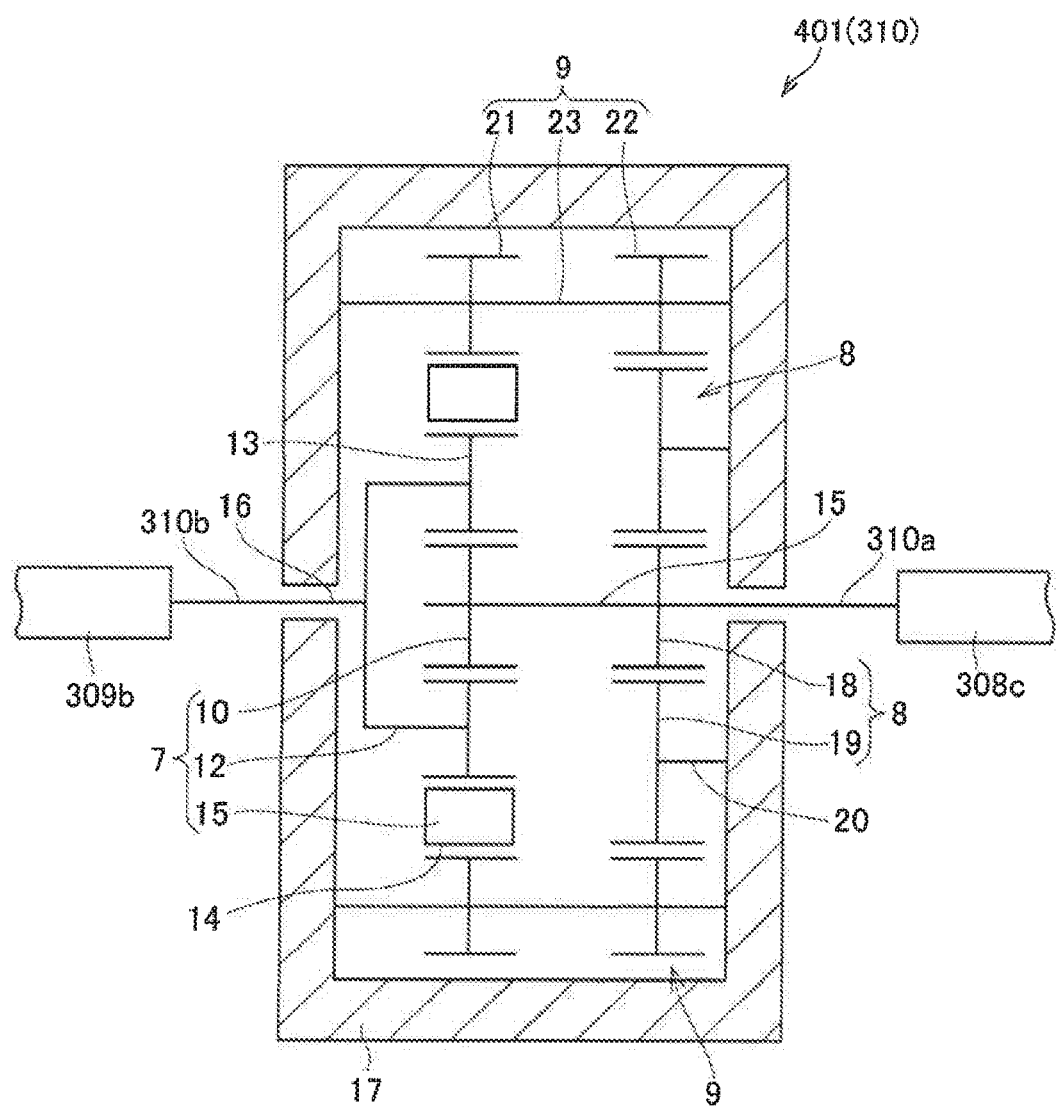
FIG. 16 is a view showing one example of a braking motor-oriented speed reducing mechanism installed in the braking actuator shown in FIG. 15.

The braking motor-oriented speed reducing mechanism 310 in the above-mentioned parking brake mechanism 302 can be formed by, for example, a gear mechanism 401 similar to the previously mentioned speed reducing mechanism 5, as shown in FIG. 16. This gear mechanism 401 shown in FIG. 16 includes the planetary gear unit 7, the counter gear set 8, and the outer gear set 9. A size of the gear mechanism 401 is set according to a desired speed reduction ratio or size of the braking actuator 61 (62, 72, 83, or 84). Therefore, the gear mechanism 401 and the speed reducing mechanism 5, although having different sizes, have basically the same configuration. In FIG. 16, members common to the previously mentioned speed reducing mechanism 5 shown in FIGS. 1 and 2 are assigned with common reference symbols.

In the gear mechanism 401 shown in FIG. 16, the sun gear shaft 15 serves as the input shaft 310a of the braking motor-oriented speed reducing mechanism 310, and the carrier shaft 16 serves as the output shaft 310b of the braking motor-oriented speed reducing mechanism 310. The rotor shaft 308c of the braking motor 308 is coupled to the input shaft 310a, and the feed screw member 309b of the feed screw mechanism 309 is coupled to the output shaft 310b. Therefore, the braking motor-oriented speed reducing mechanism 310 formed by the gear mechanism 401 can transmit the output torque of the braking motor 308 to the feed screw mechanism 309 while multiplying.

As previously mentioned, the braking motor-oriented speed reducing mechanism 310 configured using this gear mechanism 401 also enables a considerably larger speed reduction ratio to be set compared to in a conventional configuration. Therefore, this braking motor-oriented speed reducing mechanism 310 makes it possible for the output torque of the braking motor 308 to be transmitted significantly multiplied to the feed screw mechanism 309. As a result, the braking motor 308 can be significantly downsized. Consequently, the braking actuator 61 (62, 72, 83, or 84) can be significantly downsized and weight-lightened.

Figure 17:
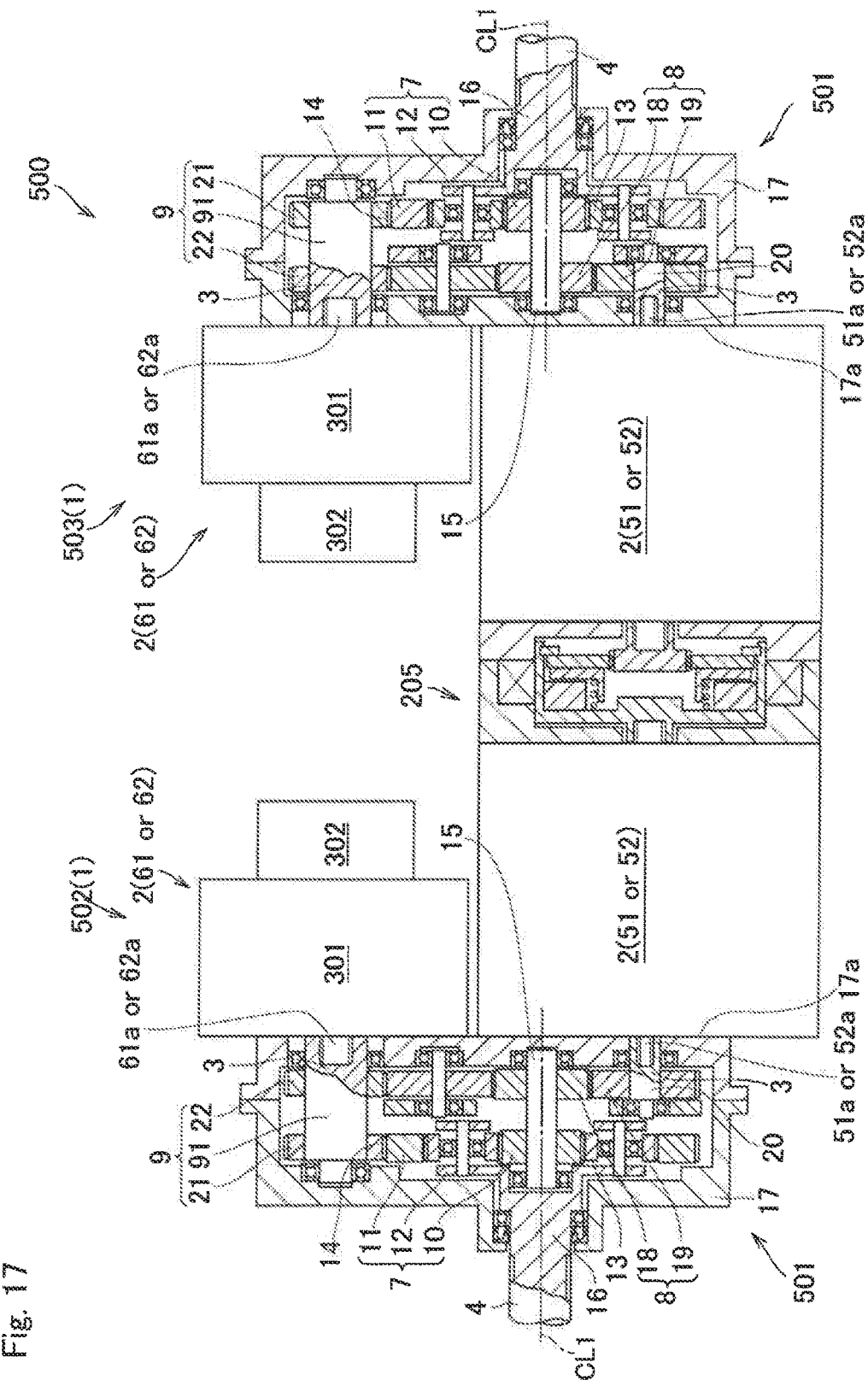
FIG. 17 is a cross-sectional view showing an eleventh embodiment in which the vehicular power unit is applied to configure an on-board type drive unit.
Figure 18:
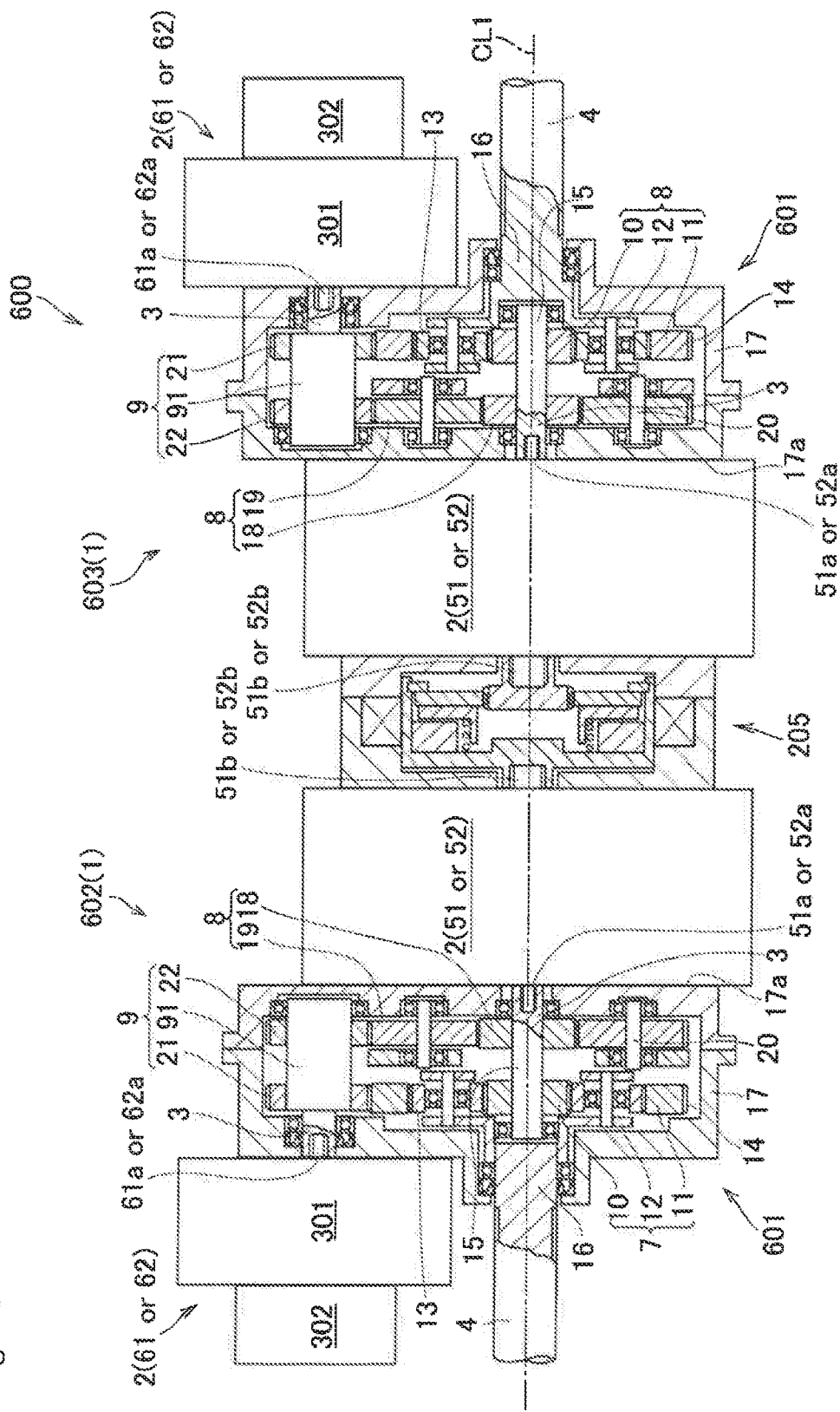
FIG. 18 is a cross-sectional view showing a twelfth embodiment in which the vehicular power unit is applied to configure an on-board type drive unit.

FIGS. 17 and 18 show another example of an on-board two-motor drive unit configured using the vehicular power unit 1 in the embodiments of the present disclosure. Note that in FIGS. 17 and 18, members common to those in the previously covered drawings are assigned with common reference symbols.

An on-board two-motor drive unit 500 shown in FIG. 17 is formed by two sets of an on-board type vehicular power unit 1. Specifically, the on-board two-motor drive unit 500 is formed by combining a left-side unit 502 and a right-side unit 503. The left-side unit 502 comprises: the axle 4 that transmits power to a left-side wheel (not illustrated); the actuators 2; the input shafts 3; and a speed reducing mechanism 501. On the other hand, the right-side unit 503 comprises: the axle 4 that transmits power to a right-side wheel (not illustrated); the actuators 2; the input shafts 3; and the speed reducing mechanism 501.

The speed reducing mechanism 501 has basically the same configuration as the previously mentioned speed reducing mechanism 5 shown in FIGS. 13 and 14. However, the speed reducing mechanism 501 shown in FIG. 17 includes only one set of the outer gear set 9. Note that the speed reducing mechanism 501 may be provided with two or more sets of the outer gear sets 9. Even when only one set of the outer gear set 9 is provided as in this example shown in FIG. 17, the ring gear 11 is supported in a rotatable manner by the planetary gear 13 engaging with the internal teeth of the ring gear 11.

The left-side unit 502 and the right-side unit 503 both include a plurality of the input shafts 3, and a plurality of the actuators 2 are respectively coupled to each of the input shafts 3. In the example shown in FIG. 17, the input shafts 3 are coupled, respectively, to the counter gear shaft 20 and the pinion shaft 91. That is, the counter gear shaft 20 and the pinion shaft 91 serve as the input shafts 3. Moreover, the carrier shaft 16 is coupled to the axle 4 so as to serves as the axle 4. In addition, in the example shown in FIG. 17, the driving actuator 51 (or 52) and the braking actuator 61 (or 62) are provided as the actuators 2. Note that the braking actuator 61 (or 62) may include the service brake mechanism 301 and the parking brake mechanism 302, as in the previously mentioned example shown in FIG. 15.

The left-side unit 502 and the right-side unit 503 are disposed so that respective fellow back surfaces 17a face each other. Therefore, the axle 4 of the left-side unit 502 and the axle 4 of the right-side unit 503 are disposed on the same axis, and each project outwardly in the vehicle width direction.

The left-side unit 202 and the right-side unit 204 in the previously mentioned on-board two-motor drive unit 200 shown in FIGS. 13 and 14 both have a plurality of the actuators 2 disposed on the outer side of the vehicle. That is, the plurality of actuators 2 are disposed on an opposite side to the back surface 17a in the rotational axis CL1 direction. Therefore, the plurality of actuators 2 are each disposed on an outer peripheral side in the radial direction of the axle 4 across the axle 4. In the previously mentioned example shown in FIG. 14, the driving actuator 51 (or 52) and the braking actuator 61 (or 62) are each disposed on the outer peripheral side in the radial direction of the axle 4 across the axle 4. In contrast, it is also possible for the on-board two-motor drive unit in the embodiments of the present disclosure to have the plurality of actuators 2 disposed on an inner side of the vehicle. That is, the plurality of actuators 2 can be disposed on the back surface 17a side of the case 17 in the rotational axis CL1 direction. Alternatively, it is possible for certain ones of the plurality of actuators 2 to be disposed on the back surface 17a side of the case 17 in the rotational axis CL1 direction.

In the on-board two-motor drive unit 500 shown in FIG. 17, the driving actuator 51 (or 52) and the braking actuator 61 (or 62) are disposed on the back surface 17a side (the right side in FIG. 17) in the left-side unit 502. An output shaft 51a (or 52a) of the driving actuator 51 (or 52) is coupled to the input shaft 3 that rotates integrally with the counter gear shaft 20. An output shaft 61a (or 62a) of the braking actuator 61 (or 62) is coupled to the input shaft 3 that rotates integrally with the pinion shaft 91. Similarly, the driving actuator 51 (or 52) and the braking actuator 61 (or 62) are disposed on the back surface 17a side (the left side in FIG. 17) in the right-side unit 503. The output shaft 51a (or 52a) of the driving actuator 51 (or 52) is coupled to the input shaft 3 that rotates integrally with the counter gear shaft 20. The output shaft 61a (or 62a) of the braking actuator 61 (or 62) is coupled to the input shaft 3 that rotates integrally with the pinion shaft 91.

In the example shown in FIG. 17, the output shaft 51a (or 52a) of the driving actuator 51 (or 52) has a coupling section 51b (or 52b) that projects in an opposite direction to a projecting direction of the output shaft 51a (or 52a). Moreover, the coupling section 51b (or 52b) of the driving actuator 51 (or 52) in the left-side unit 502 and the coupling section 51b (or 52b) of the driving actuator 51 (or 52) in the right-side unit 503 are coupled via the clutch 205. The clutch 205 has a similar configuration to the previously mentioned clutch 205 shown in FIGS. 13 and 14, and functions similarly to the clutch 205 shown in FIGS. 13 and 14. Therefore, in the example shown in FIG. 17, the clutch 205 is disposed between the left-side unit 502 and the right-side unit 503 in the vehicle width direction, and is configured so as to selectively couple the above-described coupling section 51b (or 52b) in the left-side unit 502 and coupling section 51b (or 52b) in the right-side unit 503.

Thus, in the on-board two-motor drive unit 500 shown in FIG. 17, the plurality of actuators 2 are disposed inwardly in a width direction of the vehicle. That is, the plurality of actuators 2 are disposed on the back surface 17a side opposite to the projecting direction of the axle 4, without straddling the axle 4. As a result, a size in the radial direction of the axle 4 can be reduced compared to when the plurality of actuators 2 are disposed sandwiching the axle 4. Therefore, build in a height direction and the front-rear direction of the on-board two-motor drive unit 500 can be downsized.

An on-board two-motor drive unit 600 shown in FIG. 18 is formed by two sets of the on-board type vehicular power unit 1. Specifically, the on-board two-motor drive unit 600 is formed by combining a left-side unit 602 and a right-side unit 603. The left-side unit 602 comprises: the axle 4 that transmits power to a left-side wheel (not illustrated); the actuators 2; the input shafts 3; and a speed reducing mechanism 601. On the other hand, the right-side unit 603 comprises: the axle 4 that transmits power to a right-side wheel (not illustrated); the actuators 2; the input shafts 3; and the speed reducing mechanism 601.

The speed reducing mechanism 601 has basically the same configuration as the previously mentioned speed reducing mechanism 501 shown in FIG. 17. The speed reducing mechanism 601 shown in FIG. 18 is also provided with one set of the outer gear set 9. Note that the speed reducing mechanism 601 may include two or more sets of the outer gear sets 9. The ring gear 11 is supported in a rotatable manner by the planetary gear 13 engaging with the internal teeth of the ring gear 11.

The left-side unit 602 and the right-side unit 603 both include a plurality of the input shafts 3, and the actuators 2 are respectively coupled to each of the input shafts 3. In the example shown in FIG. 18, the input shafts 3 are coupled, respectively, to the sun gear shaft 15 and the pinion shaft 91. That is, the sun gear shaft 15 and the pinion shaft 91 serve as the input shafts 3. Moreover, the carrier shaft 16 is coupled to the axle 4 so as to serves as the axle 4. In addition, in this example shown in FIG. 18, the driving actuator 51 (or 52) and the braking actuator 61 (or 62) are provided as the actuators 2. Note that the braking actuator 61 (or 62) may include the service brake mechanism 301 and the parking brake mechanism 302, as in the previously mentioned example shown in FIG. 15.

The left-side unit 602 and the right-side unit 603 are disposed so that respective fellow back surfaces 17a face each other. Therefore, the axle 4 of the left-side unit 602 and the axle 4 of the right-side unit 603 are disposed on the same axis, and each project outwardly in the vehicle width direction.

As previously mentioned, in the on-board two-motor drive unit in the embodiments of the present disclosure, it is possible for certain ones of the plurality of actuators 2 to be disposed on the back surface 17a side of the case 17 in the rotational axis CL1 direction.

In the on-board two-motor drive unit 600 shown in FIG. 18, the driving actuator 51 (or 52) is disposed on the back surface 17a side of the case 17 in the rotational axis CL1 direction. On the other hand, the braking actuator 61 (or 62) is disposed on a projecting side of the axle 4 in the rotational axis CL1 direction. Specifically, the driving actuator 51 (or 52) is disposed on the back surface 17a side (the right side in FIG. 18) in the left-side unit 602. On the other hand, the braking actuator 61 (or 62) is disposed on a side opposite the back surface 17a (the left side in FIG. 18) in the left-side unit 602. The output shaft 51a (or 52a) of the driving actuator 51 (or 52) is coupled to the input shaft 3 that rotates integrally with the sun gear shaft 15. The output shaft 61a (or 62a) of the braking actuator 61 (or 62) is coupled to the input shaft 3 that rotates integrally with the pinion shaft 91. Similarly, the driving actuator 51 (or 52) is disposed on the back surface 17a side (the left side in FIG. 18) in the right-side unit 603. On the other hand, the braking actuator 61 (or 62) is disposed on a side opposite the back surface 17a (the right side in FIG. 18) in the right-side unit 603. The output shaft 51a (or 52a) of the driving actuator 51 (or 52) is coupled to the input shaft 3 that rotates integrally with the sun gear shaft 15. The output shaft 61a (or 62a) of the braking actuator 61 (or 62) is coupled to the input shaft 3 that rotates integrally with the pinion shaft 91.

In the example shown in FIG. 18 also, the output shaft 51a (or 52a) of the driving actuator 51 (or 52) has the coupling section 51b (or 52b). Moreover, the coupling section 51b (or 52b) of the driving actuator 51 (or 52) in the left-side unit 602 and the coupling section 51b (or 52b) of the driving actuator 51 (or 52) in the right-side unit 603 are coupled via the clutch 205. Therefore, in this example shown in FIG. 18, the clutch 205 is disposed between the left-side unit 602 and the right-side unit 603 in the vehicle width direction, and is configured so as to selectively couple the above-described coupling section 51b (or 52b) in the left-side unit 602 and coupling section 51b (or 52b) in the right-side unit 603.

Thus, in the on-board two-motor drive unit 600 shown in FIG. 18, certain ones of the plurality of actuators 2 are disposed inwardly in the width direction of the vehicle. That is, the plurality of actuators 2 are disposed divided between the inner side and the outer side in the width direction of the vehicle, without straddling the axle 4. Therefore, the size in the radial direction of the axle 4 can be reduced compared to that of the case in which the plurality of actuators 2 are disposed across the axle 4. Moreover, by the plurality of actuators 2 being divided between the inner side and the outer side in the width direction of the vehicle, the plurality of actuators 2 can be disposed overlapped in the radial direction of the axle 4. For example, in the example shown in FIG. 18, the driving actuator 51 (or 52) and the braking actuator 61 (or 62) are disposed overlapped in the radial direction of the axle 4. As a result, downsizing of size in the radial direction of the axle 4 can be achieved. Therefore, build in the height direction and the front-rear direction of the on-board two-motor drive unit 600 can be downsized.

Although the above exemplary embodiments of the present application have been described, it will be understood by those skilled in the art that the present application should not be limited to the described exemplary embodiments, and various changes and modifications can be made within the spirit and scope of the present application.

What is claimed is:

1. A vehicular power unit including: an actuator that generates a torque; an input shaft to which the torque is applied; an axle that transmits power to a wheel of a vehicle; and a speed reducing mechanism that reduces a rotational speed between the input shaft and the axle, wherein the torque applied to the input shaft is transmitted to the axle while being multiplied to generate at least either one of a drive force or a braking force of the vehicle, wherein the speed reducing mechanism comprises:
a planetary gear unit having a sun gear, a ring gear, and a carrier;
an external gear formed in an outer peripheral section of the ring gear;
an outer gear set having a first pinion that engages with the external gear, a second pinion that is disposed on the same rotational axis as the first pinion and rotates integrally with the first pinion, and a pinion shaft that rotates integrally with the first pinion and the second pinion;
a center gear that is disposed on the same rotational axis as the sun gear and rotates integrally with the sun gear;
a counter gear that is disposed between the center gear and the second pinion and engages with both of the center gear and the second pinion;
a sun gear shaft that rotates integrally with the center gear and the sun gear;
a carrier shaft that rotates integrally with the carrier; and
a counter gear shaft that rotates integrally with the counter gear,
wherein at least any one of the sun gear shaft, the pinion shaft, or the counter gear shaft is configured as the input shaft, and
the carrier shaft is configured as the axle.

2. The vehicular power unit according to claim 1, wherein
the actuator includes a driving actuator that generates a drive torque, and
the drive torque is applied to the input shaft.

3. The vehicular power unit according to claim 2, comprising:
a plurality of the outer gear sets or a plurality of the counter gear shafts; and
a plurality of the input shafts,
wherein the actuator includes a plurality of driving actuators, and
the drive torques generated by the driving actuators are applied, respectively, to the input shafts.

4. The vehicular power unit according to claim 3, wherein
the actuator includes a plurality of the driving actuators whose characteristics differ, and
the drive torques generated by the plurality of driving actuators whose characteristics differ are applied, respectively, to the input shafts.

5. The vehicular power unit according to claim 1, comprising:
a plurality of the outer gear sets or a plurality of the counter gear shafts; and
a plurality of the input shafts,
wherein the actuator includes a driving actuator that generates a drive torque, and a braking actuator that generates a braking torque, and
the drive torque and the braking torque are inputted, respectively, to the input shafts.

6. The vehicular power unit according to claim 5, wherein
the actuator includes a plurality of the driving actuators, and a plurality of the braking actuators, and
the drives torques generated by the drive actuators and the braking torques generated by the braking actuators are inputted, respectively, to the input shafts.

7. The vehicular power unit according to claim 6, wherein
the actuator includes an ordinary braking actuator that is activated by passage of an electric current to generate the braking torque, and a parking braking actuator that is activated by passage of an electric current to generate the braking torque and that is capable of maintaining the braking torque when passage of the electric current has been stopped, and
the braking torque generated by the ordinary braking actuator and the braking torque generated by the parking braking actuator are inputted, respectively, to the input shafts.

8. The vehicular power unit according to claim 7, wherein
the actuator includes a plurality of the driving actuators whose characteristics differ, and
the drive torques generated by the driving actuators whose characteristics differ, the braking torque generated by the ordinary braking actuator, and the braking torque generated by the parking braking actuator are inputted, respectively, to the input shafts.

9. The vehicular power unit according to claim 1, wherein
the wheel includes a tire grounded on a road surface and a wheel frame fitted with the tire, and
the actuator, the input shaft, the axle, and the speed reducing mechanism are disposed in an inner peripheral portion of the wheel frame, and
the wheel frame is coupled to the axle.

10. The vehicular power unit according to claim 9, wherein
the pinion shaft or the counter gear shaft is configured as the input shaft, and
the actuator is disposed between the speed reducing mechanism and the wheel frame in a rotational axis direction of the axle.

11. The vehicular power unit according to claim 1, wherein
the wheel includes a left-side wheel and a right-side wheel provided on both sides in a vehicle width direction,
the vehicular power unit comprises:
a left-side unit having the axle that transmits power to the left-side wheel, the actuator, the input shaft, and the speed reducing mechanism; and
a right-side unit having the axle that transmits power to the right-side wheel, the actuator, the input shaft, and the speed reducing mechanism, and
the left-side unit and the right-side unit are disposed facing each other with projecting directions of their respective axles configured oppositely to each other in the vehicle width direction.

12. The vehicular power unit according to claim 11, wherein
the left-side unit includes a left-side coupling section in which the sun gear shaft is projected in an opposite direction to the left-side wheel in the vehicle width direction, the right-side unit includes a right-side coupling section in which the sun gear shaft is projected in an opposite direction to the right-side wheel in the vehicle width direction, and the vehicular power unit further comprises a clutch that selectively couples the left-side coupling section and the right-side coupling section.

13. The vehicular power unit according to claim 11, wherein the pinion shaft or the counter gear shaft is configured as the input shaft, the actuator in the left-side unit is disposed between the speed reducing mechanism and the left-side wheel in the vehicle width direction, and the actuator in the right-side unit is disposed between the speed reducing mechanism and the right-side wheel in the vehicle width direction.

14. The vehicular power unit according to claim 1, wherein the actuator includes a braking actuator that generates a braking torque, and the braking torque is inputted to the input shaft.

15. The vehicular power unit according to claim 14, further comprising:

a plurality of the outer gear sets or a plurality of the counter gear shafts; and a plurality of the input shafts, wherein the actuator includes a plurality of the braking actuators, and the braking torques generated by the plurality of braking actuators are inputted, respectively, to the input shafts.

16. The vehicular power unit according to claim 15, wherein the actuator includes an ordinary braking actuator that is activated by passage of an electric current to generate the braking torque, and a parking braking actuator that is activated by passage of an electric current to generate the braking torque and that is capable of maintaining the braking torque when passage of the electric current has been stopped, and the braking torque generated by the ordinary braking actuator and the braking torque generated by the parking braking actuator are inputted, respectively, to the input shafts.

17. The vehicular power unit according to claim 14, wherein the pinion shaft or the counter gear shaft is configured as the input shaft, and the actuator is disposed between the speed reducing mechanism and the wheel in a rotational axis direction of the axle.

18. The vehicular power unit according to claim 5, wherein the braking actuator comprises:

a service brake mechanism that is activated by passage of an electric current to cause predetermined fellow friction materials to make frictional contact, thereby generating the braking torque; and a parking brake mechanism that is activated by passage of an electric current to generate the braking torque and that is capable of maintaining the braking torque when passage of the electric current has been stopped, and the parking brake mechanism comprises:

a braking motor that is activated by passage of an electric current to output a torque;

a feed screw mechanism that converts rotary motion due to an output torque of the braking motor into linear motion and generates an axial force acting in a direction causing the fellow friction materials to make frictional contact, and that is capable of maintaining the axial force when passage of an electric current to the braking motor has been stopped; and a braking motor-oriented speed reducing mechanism that transmits the output torque of the braking motor to the feed screw mechanism while multiplying.

* * * * *